Jan. 13, 1959   G. F. H. VON STROH ET AL   2,868,527
CONTINUOUS MINING MACHINE
Filed May 23, 1951   15 Sheets-Sheet 2
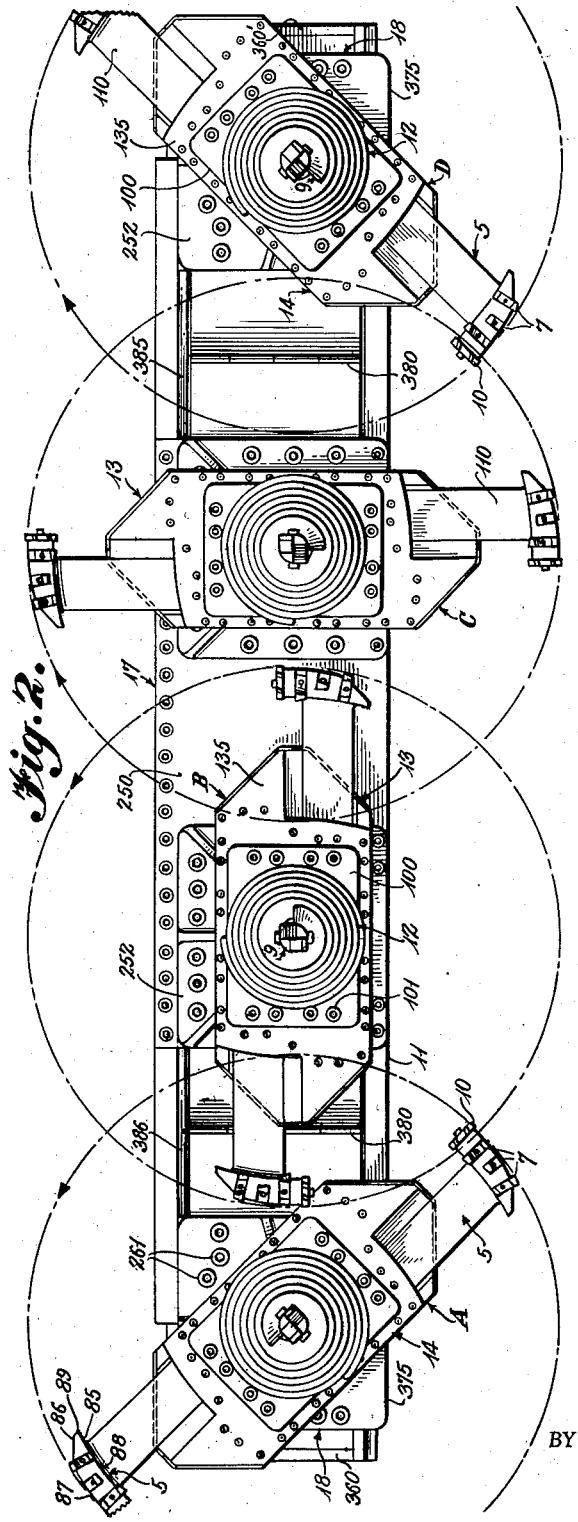
INVENTORS
Gerald F. H. von Stroh
Spencer Bowman
BY
Sidney M. Russell
ATTORNEY INVENTORS
Gerald F.H. von Stroh and
Spencer Bowman
BY Sidney M. Russell
ATTORNEY

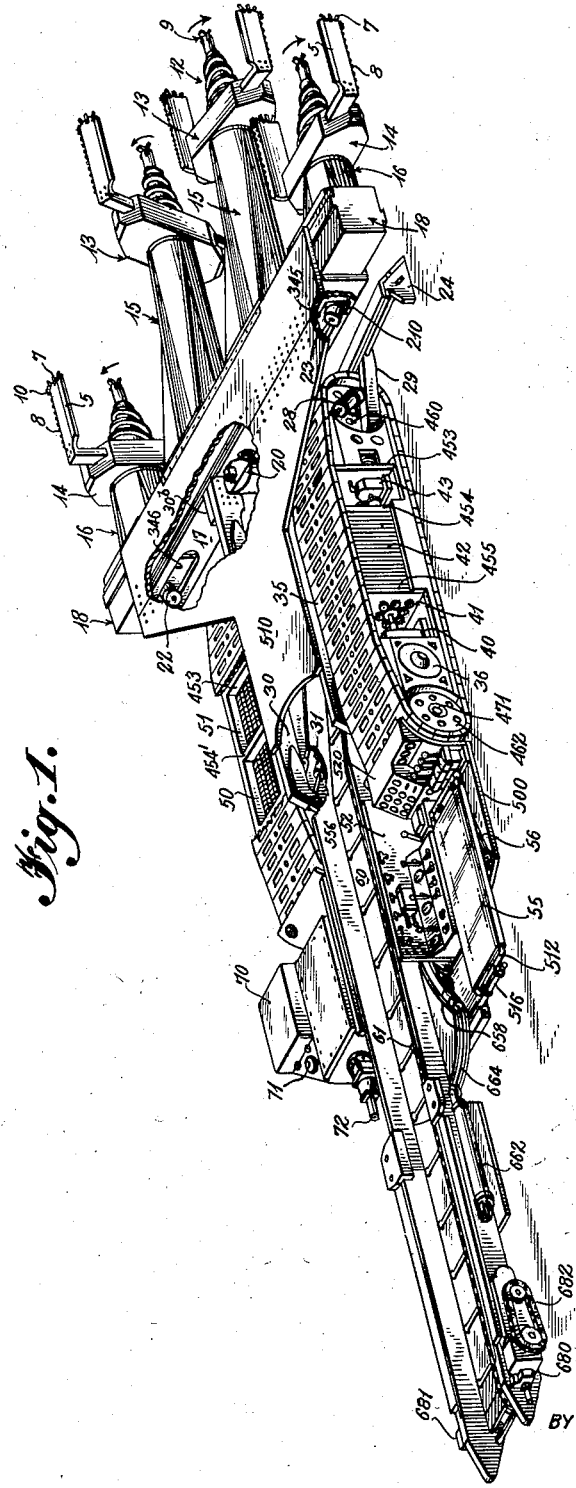

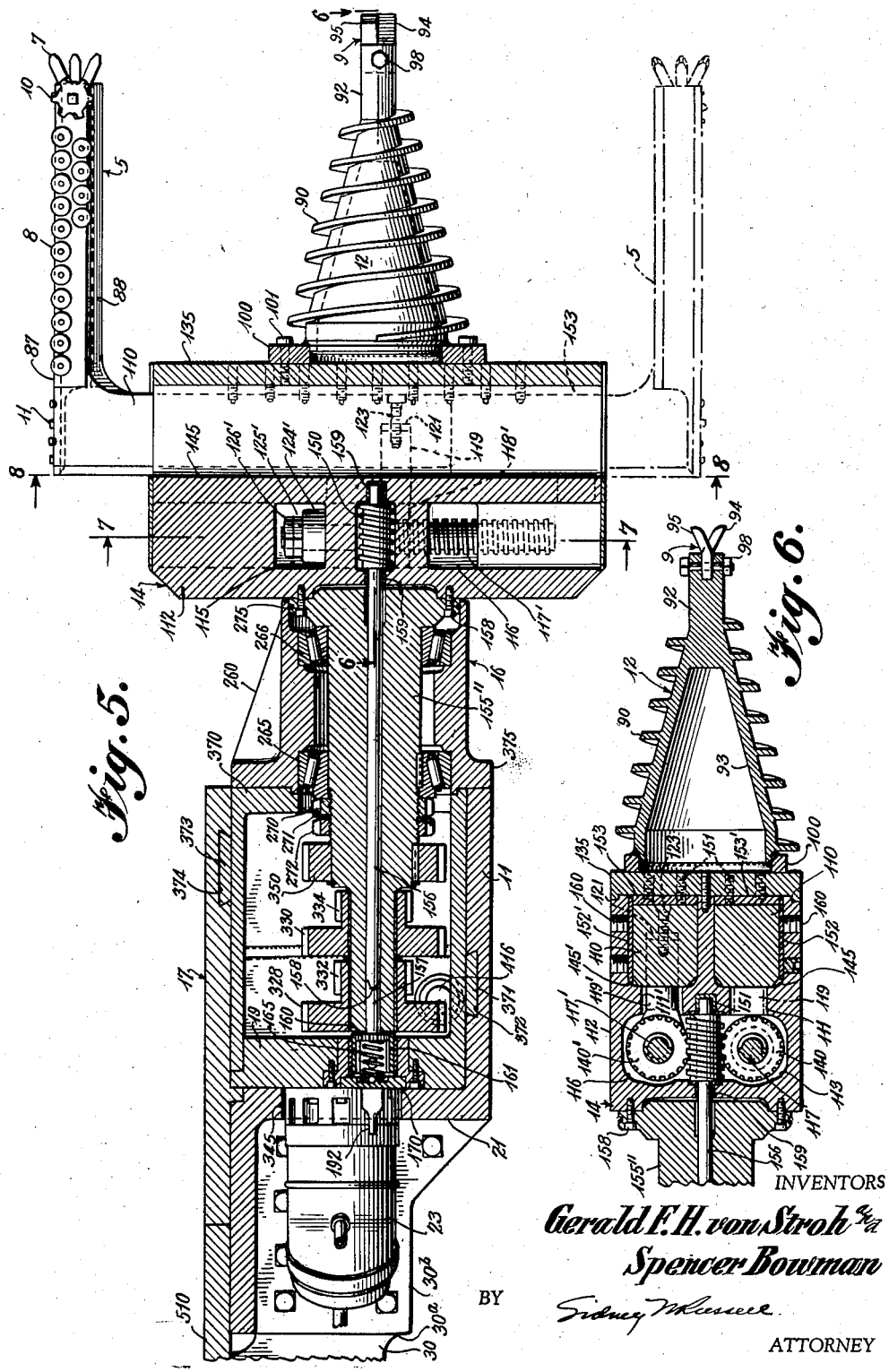

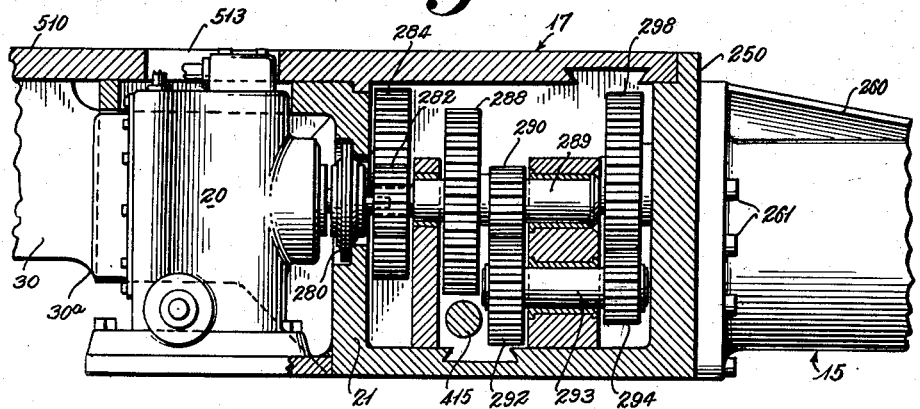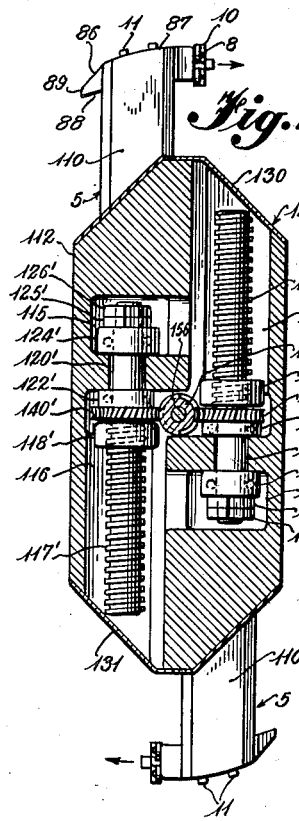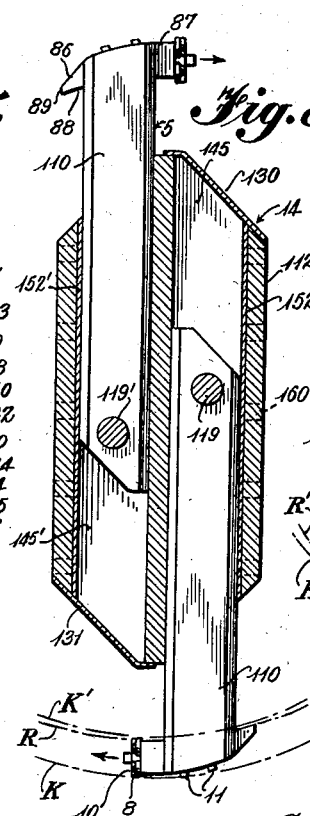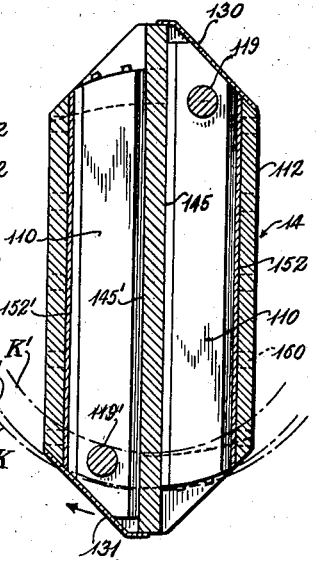

Jan. 13, 1959  G. F. H. VON STROH ET AL  2,868,527
CONTINUOUS MINING MACHINE
Filed May 23, 1951  15 Sheets-Sheet 6
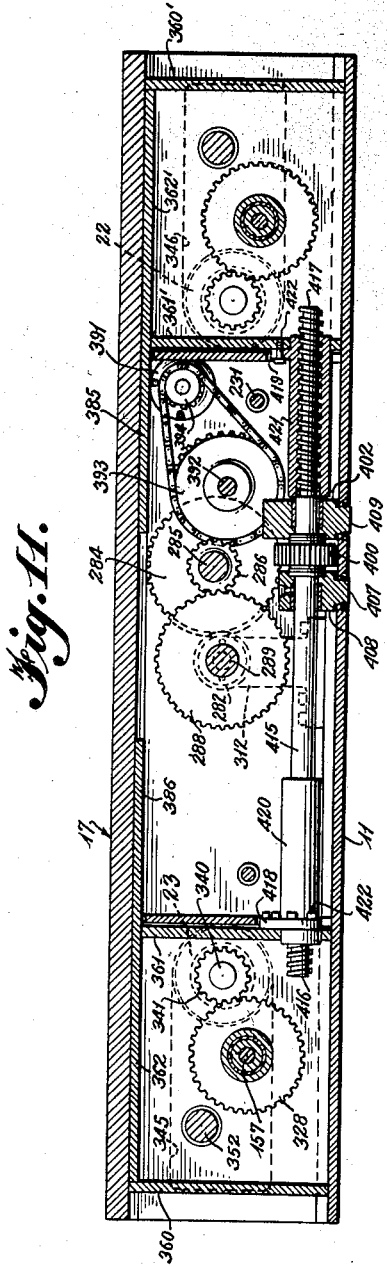
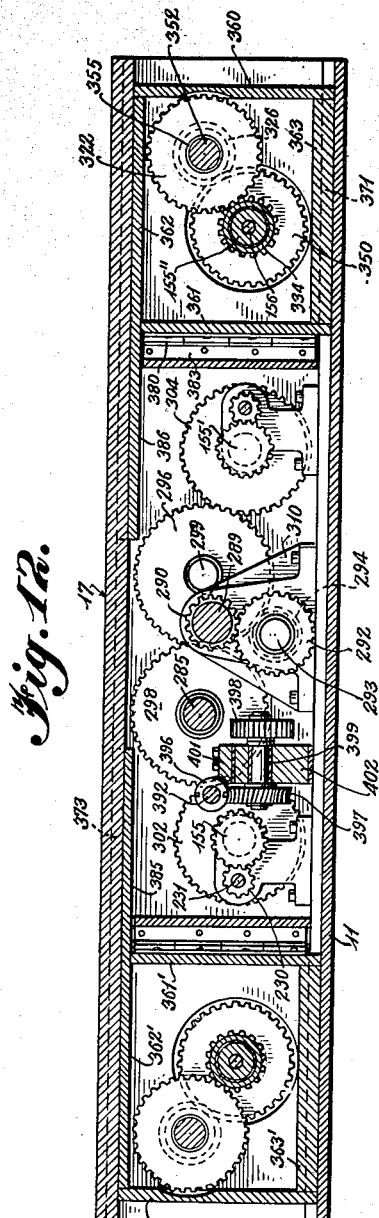
INVENTORS
Gerald F. H. von Stroh and
Spencer Bowman
BY
ATTORNEY

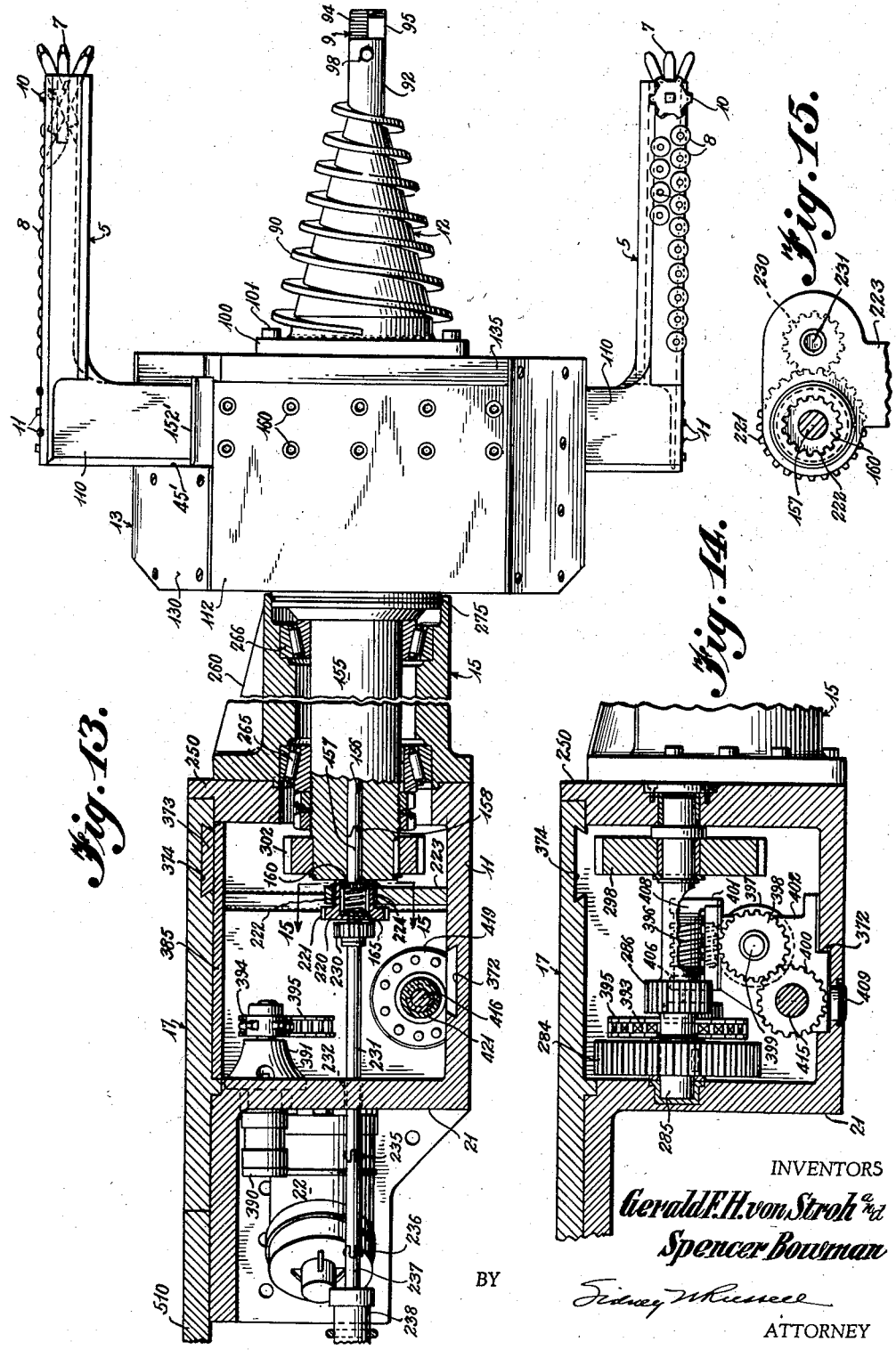

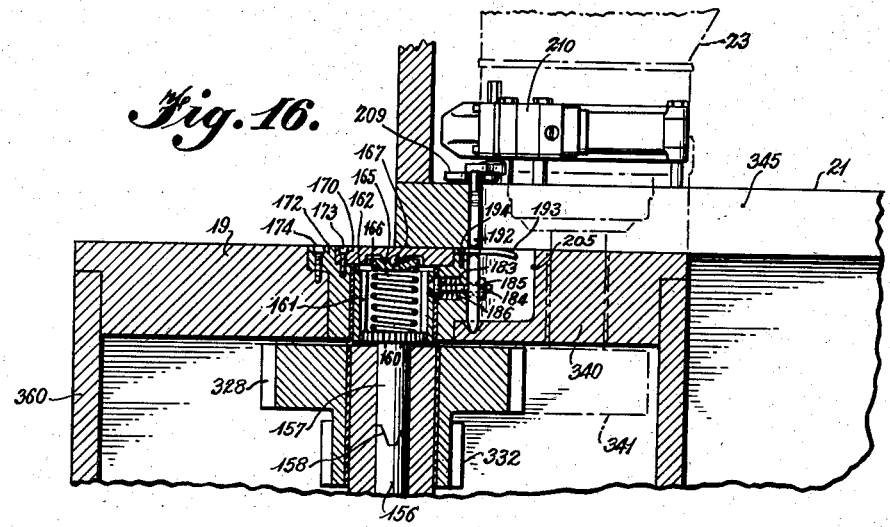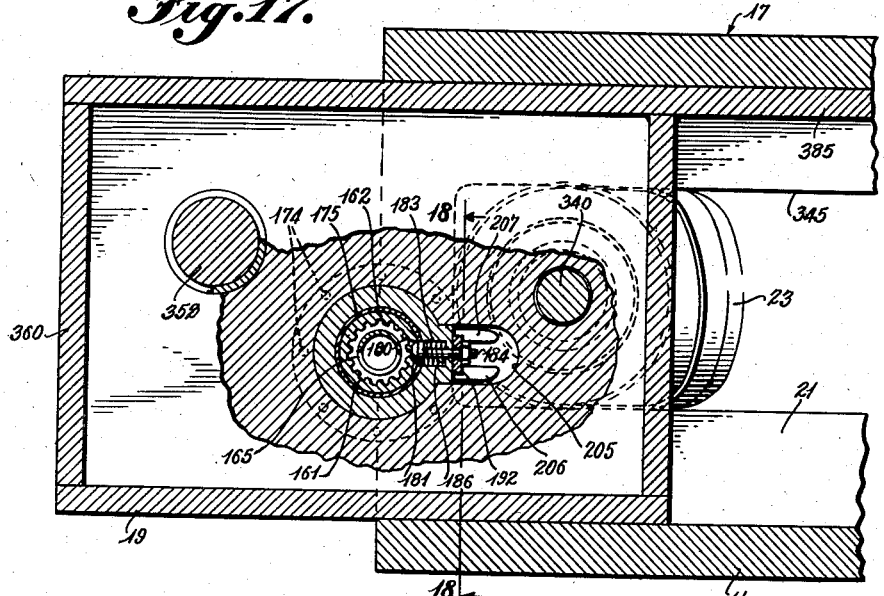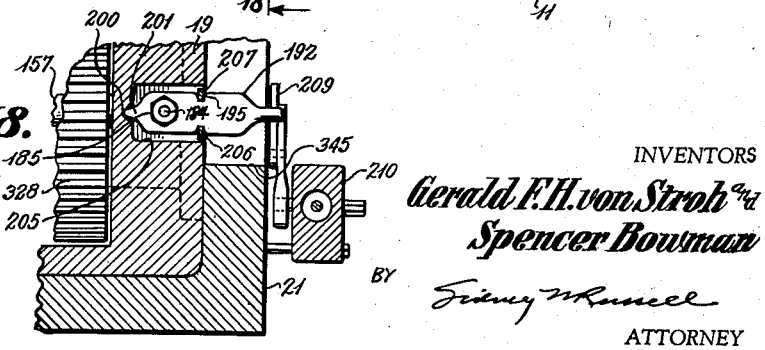

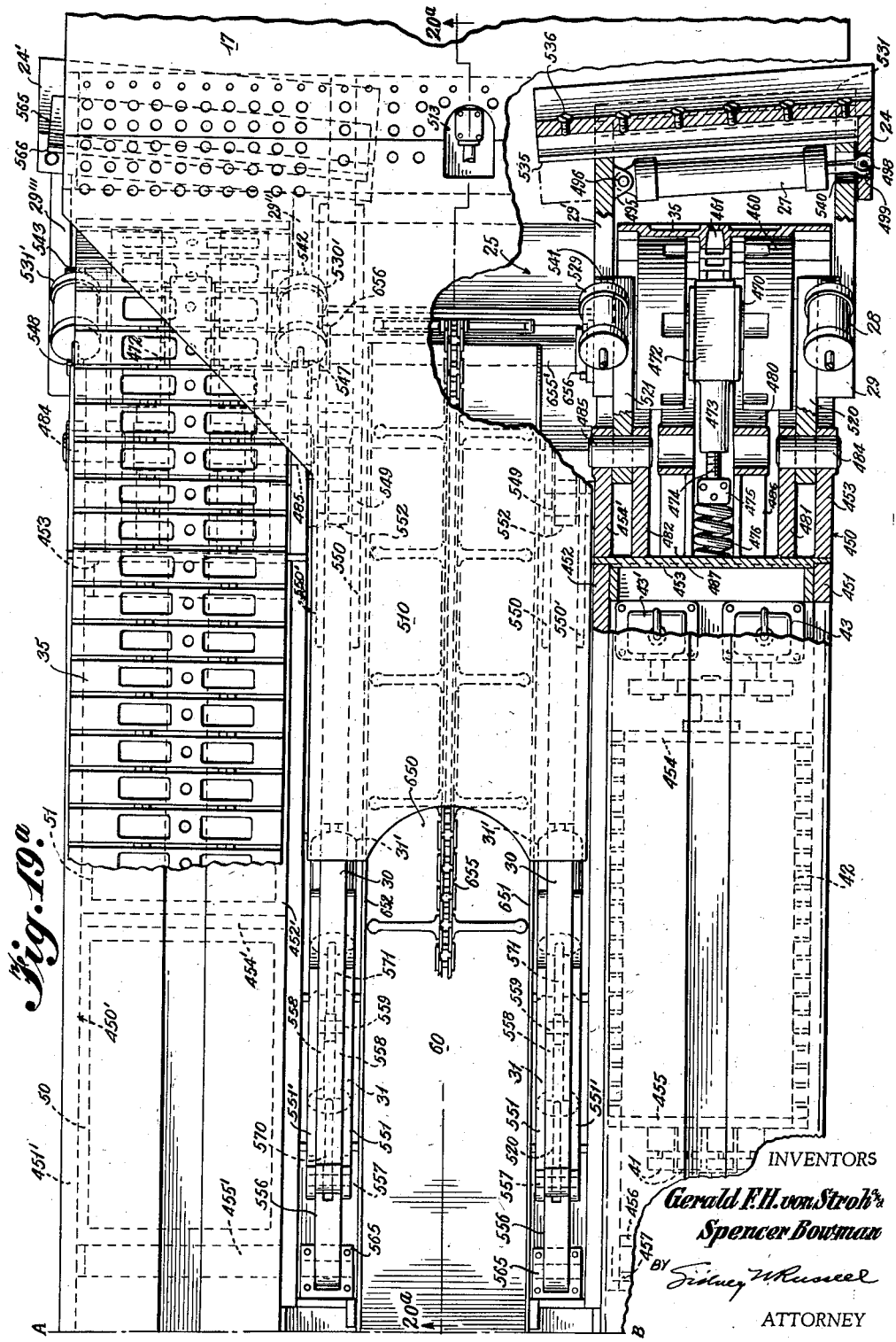

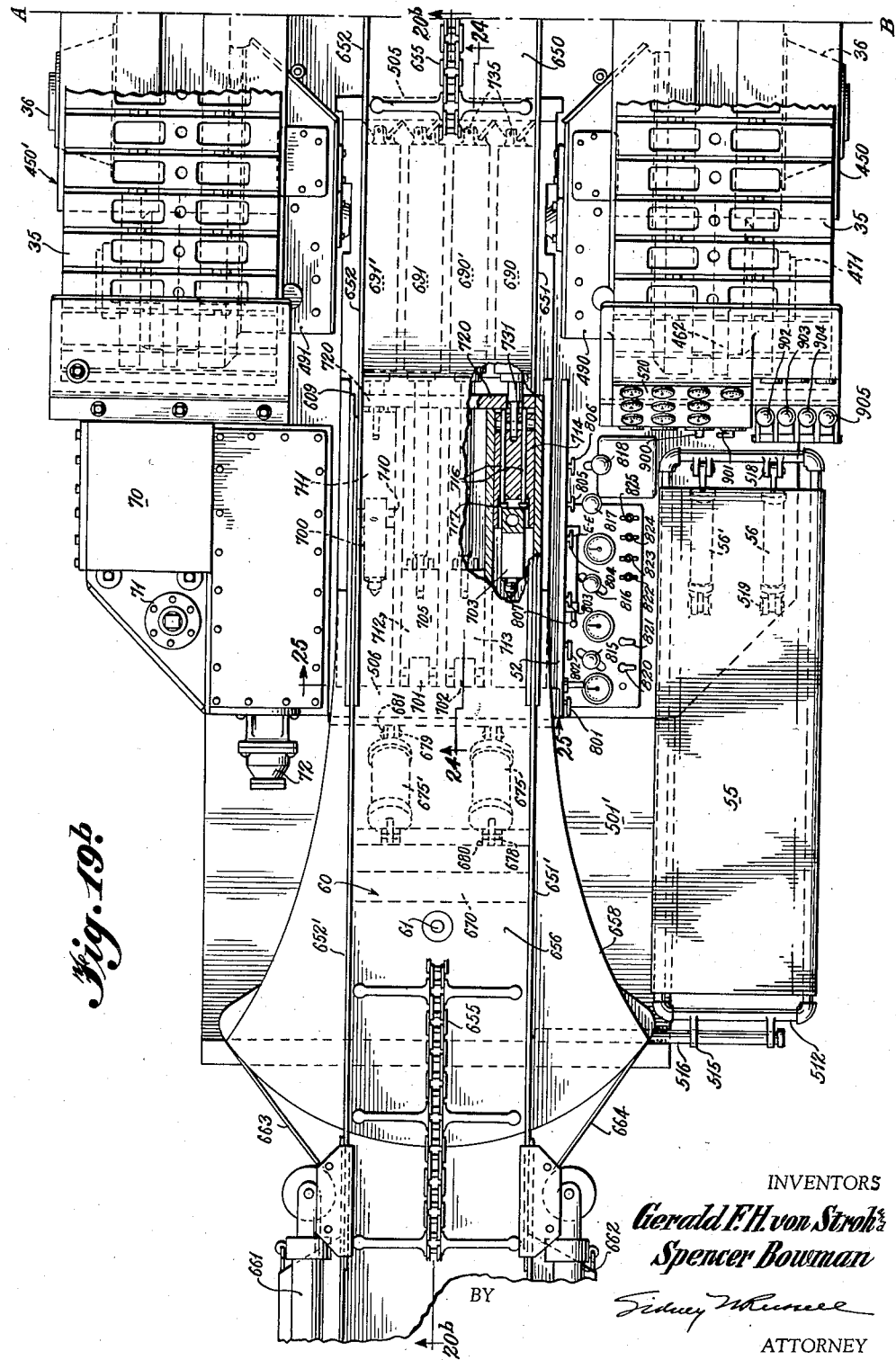

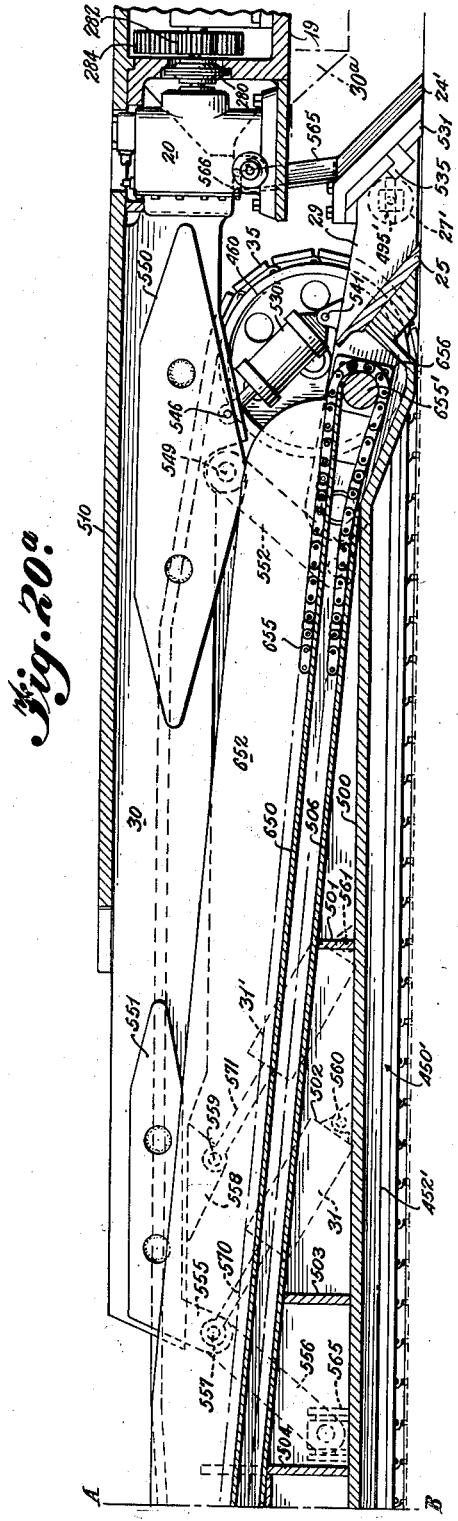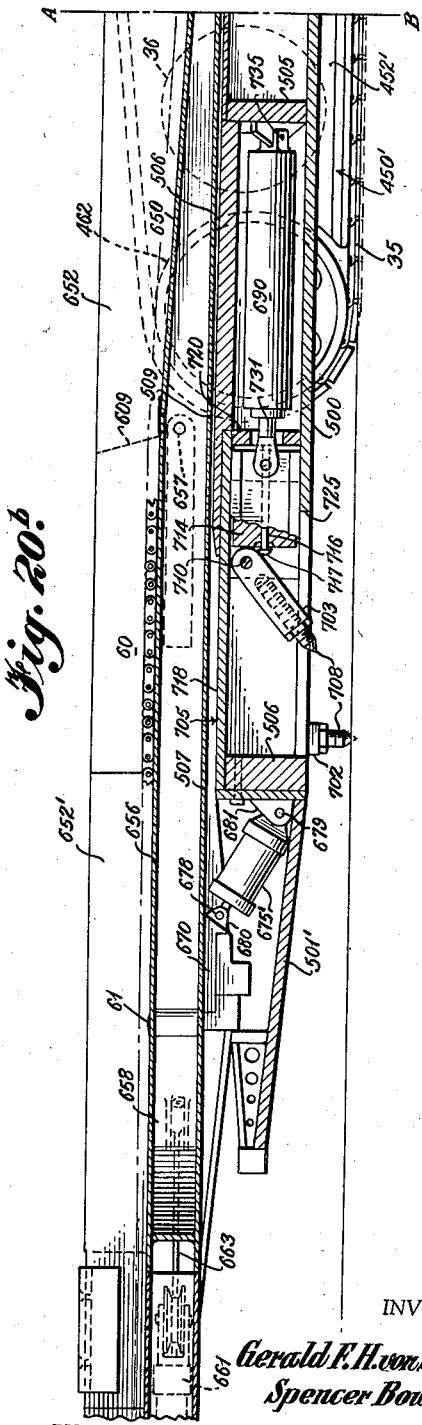

Jan. 13, 1959   G. F. H. VON STROH ET AL   2,868,527
CONTINUOUS MINING MACHINE
Filed May 23, 1951   15 Sheets-Sheet 12
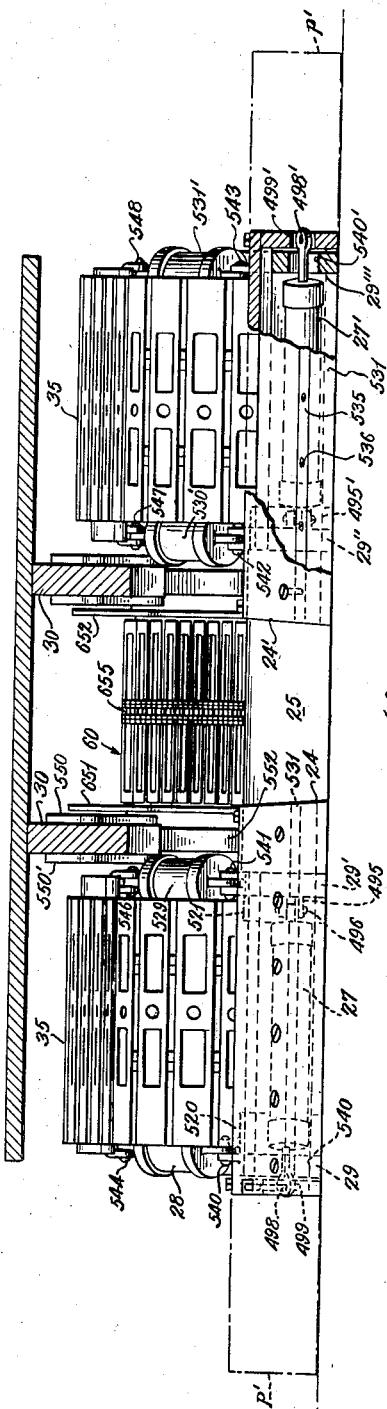
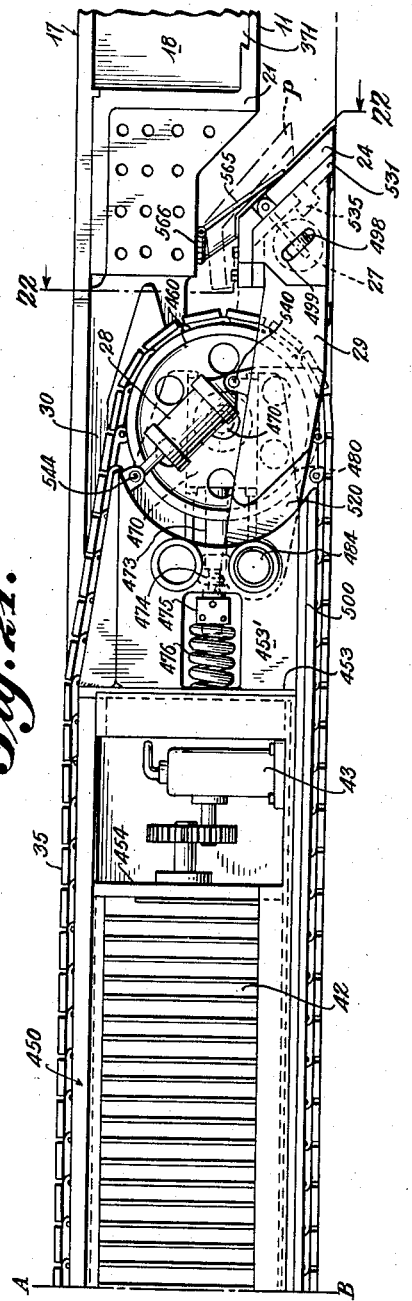
INVENTORS
Gerald F. H. von Stroh and
Spencer Bowman
BY
ATTORNEY

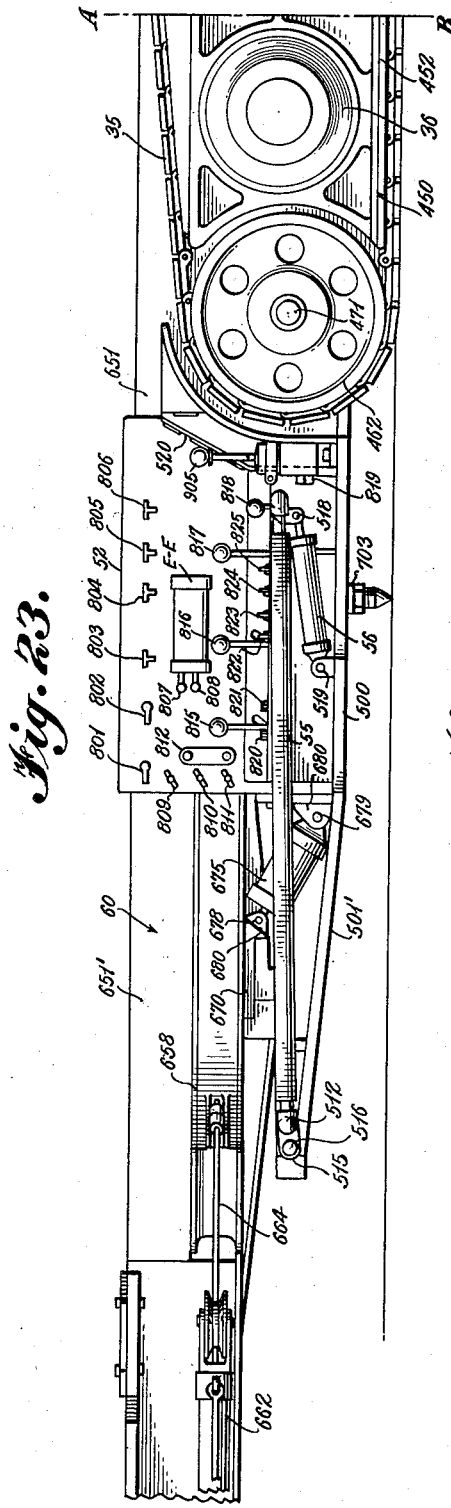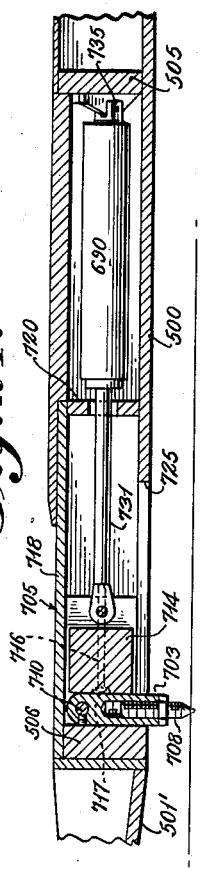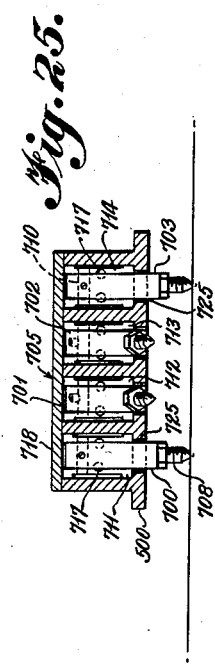

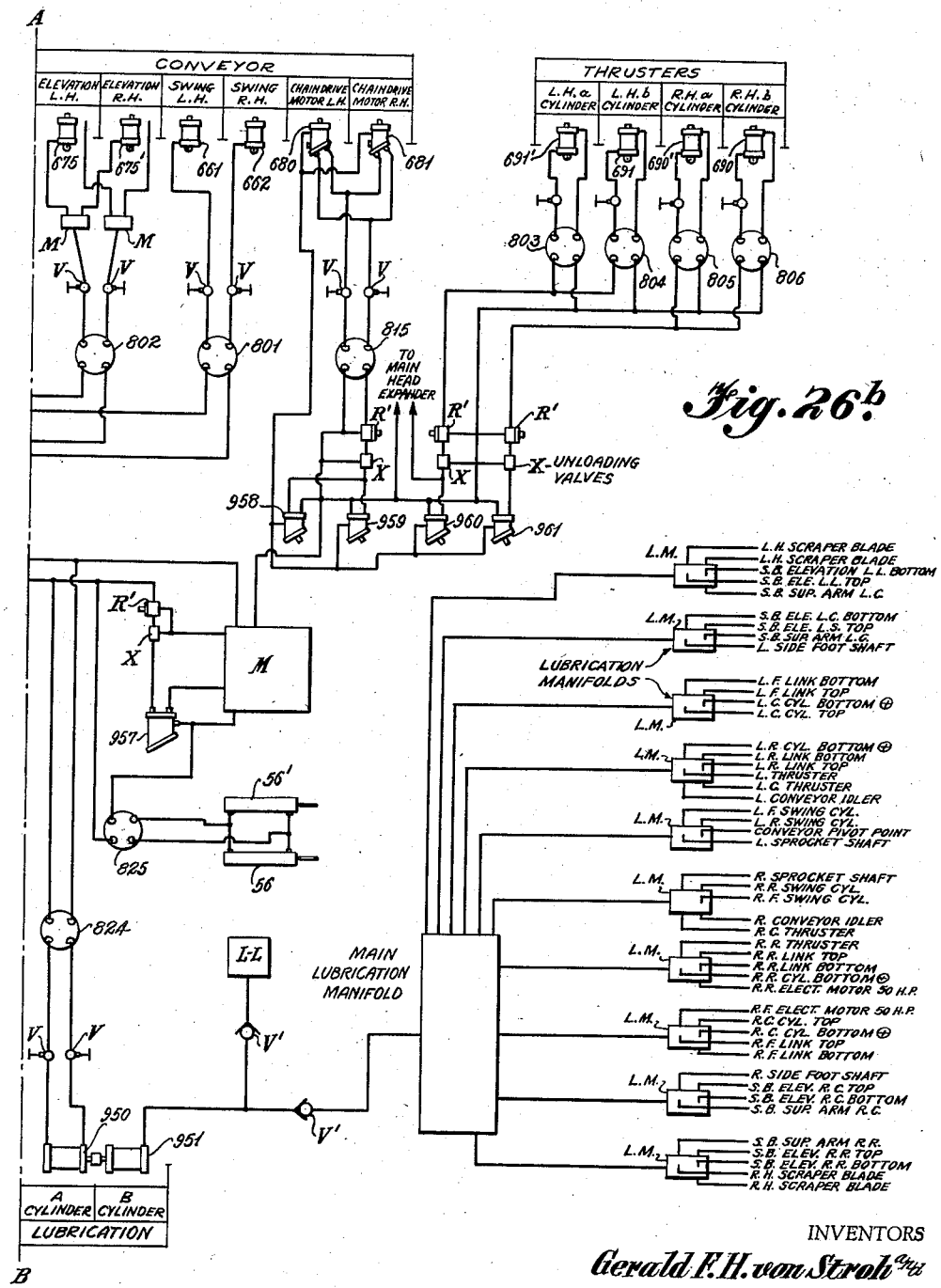

United States Patent Office 2,868,527
Patented Jan. 13, 1959

2,868,527

CONTINUOUS MINING MACHINE

Gerald F. H. von Stroh and Spencer Bowman, Huntington, W. Va., assignors to Bituminous Coal Research, Inc., Washington, D. C., a corporation of Delaware Application May 23, 1951, Serial No. 229,438

39 Claims. (Cl. 262—7)

This invention relates to a mining machine of the continuous type. More particularly described, the mechanism comprises the rotor principle of mining coal. That principle of operation may be summarized by stating that it basically consists of cutting an opening into the coal and wedging the coal into that opening; the principle contemplates elimination of drilling and blasting, and also contemplates combining cutting and loading into one continuous operation.

The mining industry in the past has been confronted with the most complex problems when continuous machines are contemplated as a solution to large output of coal. It must be appreciated that, generally speaking, in the bituminous coal regions, seams of coal range from approximately 28" or less to 120" or greater in seam height. These seams often extend for thousands of feet without decided variation in height or width. Accordingly, any mechanism designed to be adaptable to the varied conditions existing in the bituminous fields must be sufficiently flexible to mine coal of a multitude of variations in seam height. It must further be adequate to remove the full seam.

Continuous mechanisms for the mining of coal must necessarily overcome the hazards of hard substances imbedded in the seam such as the common known sulphur ball or other hard iron pyrite substances. Without sufficient regard to the stresses and strains encountered when contact is made with substances of this type, a machine may be subjected to immediate and possibly irreparable damage.

Furthermore, it is obvious that a machine penetrating a seam of coal must be so constructed that it can be withdrawn from the room mined with comparative ease. When seams of a height in the neighborhood of 28" are encountered, the problem becomes one not only of mining coal of this low type but of conveniently retracting the mechanism, and this in turn requires provision of sufficient space for insertion of mine props and crossbars which are positioned immediately following the machine while mining. Obviously, reduction in size of the machine to provide sufficient clearance for retraction after cutting provides a desirable solution. Our invention provides for such mechanism.

It is essential that any mechanism adapted for the continuous mining of coal be capable of efficient and effective operation for an extended period without expenditure of an undue amount of power. Power supplies in many fields have certain limitations and these must be met; in addition, there is the apparent undesirability inherent in any mechanism that requires power in such quantities as to make the machine impractical and the operating costs thereof excessive or prohibitive.

Machines of the so-called continuous type which have been devised in the past and which may be found in the prior art often fail to meet these basic requirements for a continuous mining mechanism. Machines utilizing the chain cutting principle are known. These mechanisms are of limited flexibility, and not adaptable to all the various conditions existent in the bituminous fields. These mechanisms, as well as others of various types, are flexible only within definite and often restrictive limits. A continuous mining mechanism has heretofore never been devised which can effectively mine coal in seams of such low height as 28" and be readily adaptable for mining cool up to 120" in seam height.

Known mechanisms for the continuous mining of coal are excessive in their power requirements, often requiring as much as 175 H. P. per unit to conduct the cutting or mining operation exclusive of the requirement for motion of the mechanism itself.

Similarly, the turning capacities of such machines are often known to limit the maneuverable characteristics thereof. A continuous mining machine should have sufficient flexibility to operate under existing room and pillar mining systems: driving entries, rooms, crosscuts and removing pillars without the use of auxiliary cutting and loading equipment. It is desirable that a continuous machine be able to turn upon a comparatively small radius. Previous mechanisms for the continuous mining of coal are unable to fulfill these desirable requisites.

The problem of retractability is one of the greatest significance and has become excessively troublesome in machines of the prior art. Without a flexible construction that will permit reduction in size sufficiently to provide adequate clearance for the machine after cutting, particularly with respect to the usual mine props and crossbars which are inserted after cutting, in order that retraction may be simply and easily accomplished, the mechanism possesses an inherent and grave disadvantage.

The mechanism of our invention obviates many of the disadvantages of prior art machines enumerated in the foregoing. The principle of mining developed by this invention involves the use of a series of rotors or rotating arms upon which cutter elements are mounted. These cut a circular kerf in the face and are utilized in conjunction with a bursting screw mounted upon the center axis of rotation of each rotor arm. Specifically, the operation consists of trepanning the face with drilling and bursting at the center thereof. The conjoint effect of the cutting of the rotor arms and bursting impulse of the screw is to effectively crack or break the coal in a rapid and efficient manner. In contrast to many prior art devices, this invention contemplates a relatively small area of kerf, cracking and bursting being accomplished by means of a wedge. The resultant pieces of coal are of a desired consist, with a minimum of fines and oversized chunks.

The mechanism of our invention is adjustable in size. The rotors, for example, in the low coal version of the invention, may be made adjustable for cutting purposes from a minimum seam height of 28" to a maximum seam height of 38". This is accomplished by mechanical expedients, hydraulically powered, comprising suitable gearing and the necessary components thereof for the extension and retraction of the rotor arms within their respective housings.

In a machine of multiple rotors, such as here disclosed, the outboard rotor assemblies thereof are also movable outwardly from a given minimum distance to a substantially increased width. In the commercial embodiment of this invention, for example, the overall width of the mechanism may be increased from approximately seven feet to an effective cutting width of approximately ten feet.

In addition, the mechanism of our invention as here described involves a movable carriage for the entire head of the machine permitting a series of rotors, here disclosed as four in number, to be moved in unison upwardly or downwardly a given and predetermined distance. Thus, variation in seam height is accommodated by increasing the height of the center axis of said rotors above room floor and employing rotor arms of greater radii.

The entire mechanism, being mounted upon tractor treads, may be turned to the right or the left and maneuvered with ease to the desired position. Conventional conveying equipment can be utilized, as an adjunct to the invention herein disclosed, to convey the coal so mined as described in the foregoing.

Excessive thrust is often necessary to effectively mine seams of particularly hard consist and this is accomplished by the provision of hydraulic thrusters which, at the will of the operator, exert tremendous force in a forward direction in addition to the forward thrust exerted by the forward motion of the treads themselves.

From the foregoing, it will be readily appreciated that we have provided a unique and novel mechanism for the continuous mining of coal. It is a prime object of this invention to provide a mechanism which, as a mining unit, has a mining head adjustable in size both horizontally and vertically for adaptation to various sized seams and whereby, after mining a given seam, retraction of the mechanism is simplified and accomplished with ease.

It is a further object of the invention to provide a means for continuously mining coal which contemplates the use of mechanism readily adaptable to the use of various sized rotors which are interchangeable, in order that seams of various heights and widths may be mined without material alteration to the mining mechanism itself. Thus, the mechanism is effective in the mining of both so-called "low coal" as well as "high coal."

An additional object of the invention is to provide a mechanism for mining of coal which is extremely maneuverable in over-all characteristics, and which can be made with a comparatively small turning radius.

A further object of the invention is to provide a mechanism capable of operation by a single operator and which does not call for excessive and burdensome supervision.

A further object of the invention is to provide a continuous means for mining wherein the entire power take-offs of the mechanism are fulfilled by the use of hydraulic pumps, motors, cylinders, and equivalent hydraulic media.

A further object of the invention is to provide an efficient continuous mining machine wherein the power requirements are extremely low; in the commercial embodiment of the mechanism herein disclosed, the main drive for the rotors, as well as the expansion and retraction mechanism therefor, may be adequately operated through the use of a single electric motor. As herein described, electric power requirements for the drive of the treads are limited and are of relatively low capacity. Such drive contemplates the use of an electric motor for each tread. The extremely low over-all horsepower requirement of the mechanism is in definite contrast to prior art machines often necessitating power output of three times as much, or more.

An additional object of the invention is a provision of means to substantially, automatically and efficiently mine coal at an excessively high rate of speed. In the bituminous fields, the machine will successfully and continuously operate at a coal output in excess of two tons per minute.

A further purpose and object of this mechanism is the provision of a machine of the character described wherein the main rotor transmission housing of the mechanism is sealed against dirt, coal dust and other undesirable foreign matter by the use of air pressure built up within the said head. Our invention also contemplates the use of a one-shot lubrication system which simplifies to the extreme the constant problem of lubrication in a device comprised of a comparatively large number of moving parts.

Another object of our invention is the provision of a machine of the character described wherein the cutting rotor arms and the bursting screws used in conjunction therewith are easily exchangeable and replaceable, and wherein said arms can be varied in size to suit different conditions. For example, as described in this modification of the invention, the mechanism is particularly suitable for the mining of low coal or of seams of coal varying from 28" to 38" in seam height. By replacement of the rotor arms and linkages for raising and lowering the main transmission housing, supplanting therefor larger rotor elements and linkages of greater length, the machine is easily convertible to one which can mine intermediate or high coal seams, the latter often being of a height of 120" or more.

A further object of this invention is the provision of means, and a method, for mining coal wherein the coal obtained is of the desired consist, comprising an extremely coarse coal with a minimum of fines and oversized chunks.

An added object and advantage of this invention is the provision of a mechanism which mines the seam in such manner that the roof thereof is cut with a semi-circular rib therein; this is an extremely advantageous condition for roof control and safety.

Another object of the invention is the provision of a mechanism which gently handles the coal in its solid form with a minimum disturbance thereof, as contrasted with blasting, and drilling of the seam in other ways, which tend to weaken and fracture the roof strata.

An additional object of the invention is to provide a continuous mining machine which can mine coal at an extremely high output with an excessively low cost per ton of coal mined.

A further object of this invention is to provide a machine which is adaptable to any conventional system of mining and to any of the various types of coal fields which are now known.

From the following more detailed description, other objects and advantages of this invention will be more apparent to those skilled in the art. Reference will now be made to the drawings for a more particularized disclosure of the invention, wherein:

Figure 1 is a perspective view, partly in section, of the continuous mining machine comprising our invention;

Figure 2 is a front elevation view of the rotor arms in extended operative position;

Figure 3 is a front elevation view similar to Figure 1, but showing the rotor arms in contracted position and the rotors positioned with respect to each other in such manner as to occupy a minimum of space;

Figure 5 is a sectional view taken on the line 5—5 of Figure 4 showing in more detail the main drive and clutch mechanism for an outboard right-hand rotor assembly;

Figure 6 is a section view taken on the line 6—6 of Figure 5;

Figure 7 is a section view taken on the line 7—7 of Figure 5;

Figure 8 is a section view taken on the line 8—8 of Figure 5;

Figure 9 is a view similar to Figure 8 but showing the rotor arms in contracted position;

Figure 10 is a section view on the line 10—10 of Figure 4 showing the main drive transmission for the inboard rotors;

Figure 11 is a section view taken on the line 11—11 of Figure 4;

Figure 12 is a section view taken on the line 12—12 of Figure 4;

Figure 13 is a section view taken on the line 13—13 of Figure 4;

Figure 14 is a section view taken on the line 14—14 of Figure 4;

Figure 15 is a section taken on the line 15—15 of Figure 4;

Figure 16 is an enlarged section view showing in more detail the clutch mechanism for the expansion and retraction of the rotor arms;

Figure 17 is a transverse section of the clutch mechanism shown in Figure 16 illustrating in more particular the hydraulic locking mechanism for stopping rotation of the clutch means;

Figure 18 is a section taken on the line 18—18 of Figure 17;

Figure 19a is a plan view, partly in section, of the forward part of the invention but broken at the main transmission casing and broken at the line A—B;

Figure 19b is a plan view, partly in section, showing the after part of the invention, and continuing the view of Figure 19a at the line A—B;

Figure 20a is a section view on the line 20a—20a of Figure 19a and also broken at A—B;

Figure 20b is a section view taken on the line 20b—20b of Figure 19b and continuing at line A—B;

Figure 21 is a side elevation view of the invention as shown in Figure 19a illustrating the mechanism for raising and lowering the scraper blades and broken at A—B;

Figure 22 is a section taken on the line 22—22 of Figure 21;

Figure 23 is a side elevation view of the mechanism as shown in Figure 19b and continuing the mechanism, at A—B, shown in Figure 21;

Figure 24 is a section taken on the line 24—24 of Figure 19b;

Figure 25 is a section taken on the line 25—25 of Figure 19b;

Figure 26b is a diagrammatic flow diagram of the other half of the hydraulic lines and equipment for control of the mechanism of this invention, continuing at the line A—B.

GENERAL DESCRIPTION OF THE INVENTION

Figure 4:
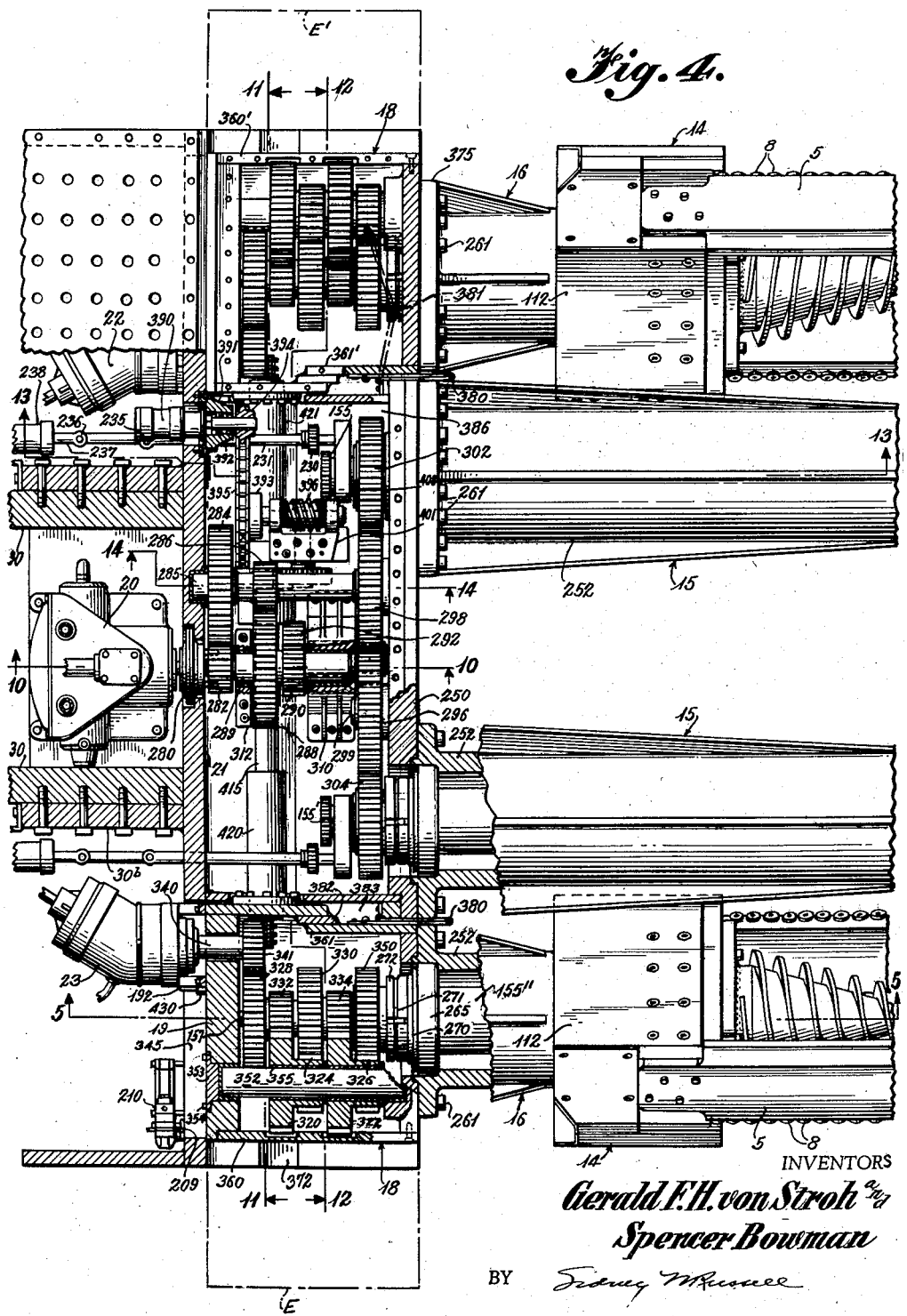
Figure 4 is a view partly in section of the transmission drives for the several rotor arms, including the main drive and means for extension and retraction of the rotor arms, the means for extension and retraction of the outboard rotor boxes, and the clutch mechanism for the inboard rotor arms.

Brief reference to Figure 1 of the drawings will enable an understanding of the main and cooperative elements of the continuous mining machine comprising this invention. In this figure, the various related parts are shown in perspective and will be generally referred to prior to a more detailed reference to the specific operating mechanism of the mining machine.

The cutting head, as here shown, consists of a series of revolving rotor arms 5 which, as here illustrated, are fitted with a stationary type of bit 7, the latter being the wellknown type of bit used in related mechanisms in the mining art. Each of these rotor arms is also provided with a series of button bits 8 which are aligned along the leading edge of each cutting rotor arm. The purpose of the latter is to cut the side walls of the bore sufficiently so as to provide an adequate clearance for the entire rotor assembly in order that the same may be expanded during the mining operation, and to eliminate binding when mining crosscuts. Centrally located about the axis of rotation of each rotor arm assembly are bursting elements 12. As shown in this figure, these elements also have a protruding bit 9. The bursters are conical in formation and are fitted with a helical screw element to perform the bursting function. In this modification of the invention, four such rotor arm assemblies, as thus far described, are provided. It will be understood, however, that any number of rotors, depending upon the conditions which must be met by the machine, may be provided. Thus, any number of rotors, from one to eight or more, may be optionally utilized to accommodate variant mining circumstances. In each case, the function of the mechanism which will hereinafter be described in more detail, namely, the main drive for the rotor, expansion and retraction of the rotor arms and expansion and retraction of the end gear box assemblies upon which the outboard motors are positioned, will be substantially the same.

Each of these rotor arms is positioned upon a rotor housing, the inboard rotors in housings 13, and the outboard rotors in housings 14. The rotor arms reciprocate within these housings in such manner that when collapsed therein the arms are positioned for retraction of the mechanism, and when extended out of the housings, the arms and bits enable cutting of a relatively large kerf. The supporting and drive mechanism for the outboard rotors is also housed in two outboard rotor end boxes or transmission casings 18. The latter are adapted for outward movement to increase the width size of the kerf. As shown in Figure 1, such end casings or end gear box assemblies 18 are in their extended position, and the rotor arms 5 are also in extended position.

It is preferable that the central rotor or rotors extend forwardly a substantial distance past the forward line of the remaining or outboard rotor assemblies and they are so shown in this figure. Such construction is decidedly advantageous. Where the center rotors are in advance of the remaining and outboard rotors, regardless of number, the stability of the machine is appreciably greater. The mechanism is designed in this manner so that it will inherently have less vibration. The piloting effect of these rotors, when so positioned, will facilitate the speed of advance of the entire machine due to the fact that the center of the face has been liberated from coal pressure, thus consuming less horsepower in the over-all kerf as the machine progresses.

Thus, the inboard rotors 13 are mounted upon extended shafts and housings 15 and the outboard rotors 14 are mounted upon shorter shafts and housings 16. This manner of positioning the rotors also enables a collapse of the outboard rotor assembly to a minimum of space as will be hereinafter explained.

All of the rotors are supported upon a transverse transmission housing 17. This transverse housing or supporting head 17 contains the operative mechanism for rotation of the rotor assemblies, for extension and retraction of the end gear boxes 18, and for extension and retraction of the rotor arms 5 as desired. The power supply for driving both of the inboard rotors comprises a hydraulic motor 20. It has been found that a variable piston type hydraulic motor of commercial and well-known design is sufficient to this end. The drives for the outboard motors receive power from two hydraulic motors of similar design.

It will be noted that viewing the machine from the rear, or from the position of the operator, the left-hand rotors are designed for counterclockwise rotation and the right-hand rotors for clockwise rotation. In the operation of the machine as it progresses forwardly, the conjoint effect of the counterclockwise and clockwise rotation of the port and starboard rotor assemblies, respectively, will cause a sweeping motion of the mined coal toward the center of the machine where it is made accessible to conveyance by the conveyor system. To facilitate this gathering operation, as well as to scoop coal from the floor of the room as the machine progresses forwardly, a series of scraper blades are located underneath the head or housing 17. These comprise two end blades 24 and a center blade 25. The end blades are angularly disposed to the transverse axis of the machine to facilitate a scooping effect, i. e., the outer edges extend forwardly the greater extent. The two end blades 24 are slidably mounted upon stationary outboard scraper blades located back of the same, and immediately adjacent thereto, in such manner that the blades 24 may be moved outwardly or inwardly as desired by the operator.

This movement of the end scraper blades 24 outwardly is accomplished by means of hydraulic cylinders 27, operatively connected to the end scraper sliding blades 24. Both of the outboard blades, as well as the inboard scraper blade, may be elevated or lowered to provide the desired clearance from room floor, and especially to provide sufficient ground clearance retraction of the mechanism. This adjustment is performed by hydraulic cylinders 28 engaging longitudinal and pivoted support members, such as support member 29, the said blades being positioned on such pivoted members.

The transmission housing 17 is supported upon two longitudinal elevator bars 30. The latter are adapted to be raised and lowered, so as to raise or lower the rotary cutting mechanism, through the use of plurality of hydraulic cylinders 31. Such elevator bars 30 are pivoted to the main frame of the tractor, or tramming apparatus, so as to enable this operation.

The entire chassis of the mechanism is movably supported upon tractor treads 35. These receive their power from two electric motors 36 on each side of the chassis. On the right side of the machine and between the treads thereof is positioned an electric motor in a suitable motor casing 42. This motor supplies the power for driving all of the hydraulic mechanism comprising the separate power outlets and control system of the invention. We have found that a single electric motor is sufficient as a power source for all of the elements involved, including fluid propulsion of the rotors, extension and retraction of the rotor arms, extension and retraction of the end rotor casings, elevation and lowering of the scraper blades, elevating and lowering of the tail boom, providing side swing for the boom, operating the thrusters, and other miscellaneous functions which will be referred to hereinafter. The aforesaid motor is designed to provide the power for propulsion of a series of piston type fluid pumps. As here shown, seven of such pumps 41 may be so driven. All of these pumps supply the hydraulic force needed by the fluid motors disseminated throughout the mechanism for various purposes, such as driving auxiliary controls and providing booster pressure. This same power source 42 also drives two larger vane type pumps 43 which are, in effect, a power supply for the motors 20 and 22, heretofore referred to. These pumps are of a commercially well-known type. Additionally, the power source 42 drives a single piston type pump 40. This may be conventional type, and is utilized for driving the central transmission for the center rotors. With respect to units 41, conventional equipment may similarly be utilized. All of these pumps and their specific purpose in the combination of this invention will hereinafter be more particularly referred to.

Upon the opposite side of the chassis and beneath the treads are two spaces for the location of auxiliary equipment in the way of controls, all of which may be considered conventional, forming no part of this invention. Thus, box 50 contains electric control equipment for the electric motor 42, and compartment 51 contains control equipment for tread drive motors 36.

In the after part of the mechanism is provided control panels 52. The series of controls, located upon such panels, and which will be more particularly described hereinafter, are adapted to enable the operator to control movement of the mechanism upon the treads, control rotation of the cutting elements, provide for expansion and contraction of the rotor arms, enable expansion and contraction of the end transmission boxes 18, and control raising and lowering of the head through adjustment of the elevator bars 30. A space along side these controls is provided for the operator who manipulates the machine from a prone position. An operator's pallet 55 is provided with hydraulic means 56 in the nature of a hydraulic ram to permit raising and lowering of the pallet to the desired position.

The machine is equipped with a conveyor means, generally indicated at 60, extending substantially throughout its length and positioned immediately adjacent the scraper blades at its forward end. This conveyor system is pivoted at 61, or at the outby end of the machine, to conventional conveyor equipment enabling transmission of the coal mined to the tipple in a manner which will be well understood.

As stated, the entire system depends for operation upon hydraulic pressure. The system is a closed system and provided with a fluid sump 70 having a fill inlet 71 permitting the system to be kept full of the hydraulic medium at all times. As is customary in most mining equipment, the power supply necessitates interconnection to the electrical system in the mine and the power outlet in his instance is indicated at 72.

The foregoing general description of the subject matter of our invention will enable an understanding of the broad and cooperative elements which are involved in the continuous mining machine comprising our invention. For purposes of clarity, those individual elements will now be discussed separately in the following further detailed descriptions.

*Rotor assembly*

As heretofore stated, the rotor arms 5 are forwardly extending members provided with stationary bits 7 or rotary bit 10. As disclosed in Figures 2, 3, 5 and 13, both types of bits are applied to the ends of each of the arms. This is for illustrative purposes only inasmuch as, ordinarily, only the straight stationary bit or alternatively the rotor bit would be used in any given mining operation. Washer bits 8 are circular bits having a central aperture and are simply bolted through that aperture completely along one side of the rotor arm, and partially along the other side thereof, as shown in Figure 7, extending slightly beyond each of such edges of the arm. Bits 11 are merely cap screws projecting above the surface of the arm a short distance, preferably approximately ⅜ of an inch. It will be apparent that bits 7 and 10 are designed to perform the primary cutting into the face of the coal; whereas, bits 8 and 11 are supplied primarily for the purpose of extension of the said arms during cutting motion thereof and while embedded in the coal seam.

The bursting elements or screws 12 are centrally mounted with respect to each pair of rotor arms. These elements are fitted with an additional bit 9. Such bits may consist of end portions 94 and 95 formed by slitting the end of a rectangular piece of sheet metal of relatively high quality and bending each of said portions in opposite directions. These bits are apertured at their after end to receive securing means such as bolts 98 which pass through a suitable aperture through the terminal end 92 of the bursters. As indicated at 93, these bursters may be hollow, the core of same conical in shape. Around this core is wound a helical strip of metal 90 thus forming a thread approximating a screw formation. It has been found that the pitch of such spirals 90 should be an amount which approximates four times the rate of advance. In actual use of the mechanism of this invention, the rate of advance has been computed at ½" per revolution. Thus, such pitch is normally 2". This bursting element is also novel in that the spirals are throughout of constant pitch. Furthermore, the spiral element 90 is flat upon its outer surface and formed with rectangular edges of uniform configuration. This enables the burster to exert a hammering effect upon the kerf due to an alternating pressure as each spiral passes a given point, and pressure release as each spiral passes said point. For example, when the flat spiral engages the face, a pressure of 500,000 lbs. p. s. i. may be exerted upon a given point in the face; as the spiral passes such given point, this relatively high pressure is suddenly and drastically reduced to practically a zero pressure. The resultant action of the burster is a successive working effect resulting, in conjunction with the cutting action of the rotor arms, in an effective breakdown of the coal. This construction, with flat, and rectangular in cross section, spirals 90, is in sharp contrast to a purely screw type of burster having sharp edged screw threads or spirals. The latter can not obtain the same hammering or working effect heretofore described. Bursters of simply screw configuration exert merely a sheer effect without substantial expansion of the same and consequent breakdown. This is due to the sharp edges of such threads and to the increasing pitch common to the purely screw type of element.

The burster element 12 is permanently secured to a base plate 100 by welding or other commonly known method. The latter is affixed to the front plate 135 of the rotor housings by suitable bolts 101. Thus, bursters 12, since not made integral with any other portion of the rotors, are easily replaceable.

The rotor arms 5 are made integral with a right angular extension or rotor arm shank 110, the latter being adapted for fitting into the several rotor casings in a manner which will be described. Referring to Figures 2, 3 and 7 to 9, it will be noted that each of said rotor arms 5 are of novel cross sectional construction. The arms must be so formed as to effectuate cutting of the kerf without binding contact therewith. To this end, the outer surface 87 and the inner surface 88 are both curved. These curves are cut on a definite radius to further obviate binding or dragging during cutting in the following manner. Outside surface 87 is made as an arc of a circle, the circumference of which is substantially less than the outside circumference of the circular kerf cut by the rotor bars when the rotor arm is in retracted position. The inner curved surface 88, however, is formed as the arc of a circle, the circumference of which is substantially greater than the inner circumference of the kerf cut by the said bits when the rotor arm is in its extended position. By reference to Figures 8 and 9, it will be seen that the outer boundaries of the kerf are designated at K and the inner boundaries of the kerf at K'. When the rotor arm is in extended position, its inner surface circumscribes a circumference R substantially greater than the circumference K'. Conversely, however, when the rotor is in retracted position such as shown in Figure 9, the outer surface 87 circumscribes a circle R' having a radius substantially less than the radius of the outer circumference of the kerf as clearly indicated in this figure. This manner of forming both the outer and inner surfaces of the rotor arms clearly eliminates drag of either the leading or trailing edges of the arm in either its retracted or extended position. Consequently, any tendency of the rotor assemblies and bits associated therewith to bind in the kerf during the mining operation is obviated.

In the preferred embodiment of this mechanism, the over-all length of such rotor shanks is 23¼". The radius upon which the outer circumference or surface 87 is made is 13½"; whereas the radius of the inner circumference constituting the inner surface 88 is 16¾". In this preferred embodiment, the diameter of cut of such rotor bars and arms when extended and as shown in Figure 7 is 38" and, when retracted, 28". Thus, the outer surface of the rotor arms is provided with sufficient clearance in its lowest mining position of 28" while still providing clearance on its inner surface when extended to 38".

Referring now to Figures 7 to 9, inclusive, it is seen that these rotor shanks 110 are slidably mounted for extension from and retraction into a series of rotor housings 112. It is obvious that such shanks with their accompanying rotor arms 5 are interchangeable as regards those rotors made for one direction of rotation. Thus the rotor arms adapted for use with clockwise cutting rotation are interchangeable, and those adapted for counterclockwise cutting rotation are interchangeable. However, each arm is designed for cutting movement in one direction so that a rotor arm adapted for cutting movement in a clockwise direction could not be interchanged with a rotor arm adapted for counterclockwise cutting movement. The construction shown in Figures 7 to 9, inclusive, illustrates a rotor casing, shank and arm, adapted for clockwise cutting movement (as viewed forwardly from the rear of the mechanism). However, since the mechanism for retraction and extension is largely the same with respect to any of the rotors herein disclosed, only these figures will be mainly referred to for explanation.

It will be seen that the casing is essentially of hexagonal shape. This permits positioning of the several rotor casings in such manner as to occupy a minimum of space vertically. For example, in Figures 2 and 3, the series of rotors are marked A, B, C and D, respectively. In Figure 2, the rotor arms are extended; in Figure 3, they are retracted. In Figure 3, rotor B is parallel to rotor A, and rotor C, parallel to rotor D. In this latter position, the series of rotors occupy substantially less height than if any of the rotors were allowed to remain vertically, as rotor C, Figure 2. In the preferred embodiment, these rotor casings are 26½" in length, yet if all of the casings are angularly disposed, 45° to the vertical, as shown in Figure 3, the over-all height of such rotors, by reason of their hexagonal shape, is reduced to 20". This factor permits the cutting of low coal of exceedingly small seam height and, in the preferred exemplification of this mechanism, a seam of 28" may thus be effectively mined and the mechanism retracted to an over-all height of 20", sufficient room clearance, in the amount of 4" above and 4" below the rotors, being provided for retraction of the mechanism.

Referring to Figure 7, it is seen that each rotor housing 112 is provided with longitudinal cavities 113 and 114 upon one side thereof, and similar cavities 115 and 116 upon the opposite side. These passageways accommodate a nut and screw mechanism by which the rotor shanks are reciprocated within guideways 145 and 145' in the casing. The screw means employed comprises threaded members 117 and 117' upon which are threaded two shank nuts 118 and 118'. The latter have extensions 119 and 119', which are interconnected with the rotor shanks in the manner indicated in Figure 6. As therein shown, suitable slots 121 in the rotor shanks 110 accommodate the said extensions and the latter are retained in the said slots by bolts 123. Transverse slots 111 and 111' permit the extensions 119 and 119' to traverse the necessary distance within the housing 112 for movement of the rotor shanks outwardly or retraction inwardly.

The threaded members 117 and 117' are provided with thrust bearings on either side of journals 120 and 120' permitting such members to ride freely during actuation thereof. For example, threaded member 117 has two such thrust bearings 122 and 124 and threaded member 117', complementary thrust bearings 122' and 124'. One end of each of the threaded members terminates in passageways 114 and 115, respectively, and at that end, suitable lock nuts are applied to the threaded members to retain them in the positions shown. With respect to member 117, such lock nuts appear as 125 and 126 and with respect to member 117', the lock nuts are shown as 125' and 126'.

Each of these threaded members 117 and 117' is provided with a worm wheel securely keyed thereto and adapted for rotation of such members. Thus, worm wheel 140, located between shank nut 118 and the thrust bearing 122, is designed to rotate that threaded member, in either direction, for extension or retraction of the rotor shank 110. Similarly, on the opposite side of casing 112, worm wheel 140' is also located between nut 118' and thrust bearing 122', being securely affixed to such threaded member for rotation thereof in either direction and consequent extension or retraction of the rotor shank. These two worm wheels 140 and 140' engage a worm 150. Referring particularly to Figure 7, it will be seen that the rotor shanks with rotor arms are shown in their extended position, with nuts 118 and 118' brought close to the face of each of the pinion gears. This position illustrates the most extended position of the rotor bars and arms. If the worm 150 now be rotated in a clockwise direction with respect to said housing as viewed in this figure, it is apparent that the reverse operation will take place. Both of the elements 117 and 117' are threaded in a right-hand manner so that in counterclockwise rotation of the worm 150, nuts 118 and 118' are caused to move toward the respective ends of the casing. This movement causes withdrawal of the rotor shanks and rotor arms into the housing 112. Withdrawal proceeds until the rotor shanks are in the position shown in Figure 9. It will be noted that the peculiar shape of the rotor arms contemplates an angular edge 86 and trailing edge 89 fashioned in such manner that in the retracted position of Figure 9 these edges exactly match the hexagonal shape of the housing 112.

Referring to Figure 6, it will be noted that the outside surfaces of each rotor shank 110 abuts a gib plate here shown as 152 and 152', respectively. The forward surfaces of each of the rotor shanks are also provided with gibs 153 and 153'. These are provided to permit adjustment of clearance or tolerance for such shanks with exactitude, and to permit compensating for wear upon the shank. Also, they are fabricated of a different metal, such as bronze, to prevent seizure when extreme loading conditions are encountered. Adjustment of the extent of force with which gibs 152 and 152' bear against each rotor bar is made by means of a series of screw elements 160, placed in a double row, as shown, and sufficiently countersunk as to not extend beyond the surface of the housing. Tolerance adjustment of the forward gibs 153 and 153' is provided for by screw elements 151. Each of the casings 112 is further provided with strips 130 and 131 which comprise cover plates for each end of the rotor housings, such plates, of course, having openings sufficiently large to permit passage of the rotor shanks 110 therethrough. These closures protect the interior of the rotor mechanism from coal dust or other foreign matter. It is apparent that the entire rotor housing with appurtenant equipment is rotated to perform the cutting operation. It has been found that a speed of rotation of approximately 25 R. P. M. for the rotors is satisfactory for most mining purposes although this speed may be varied to suit different sets of conditions.

The rotor mechanism is revolved by means of a main drive shaft 155" to which the housing is firmly affixed by any well-known method as, for example, simply by bolt 158, Figure 5. The worm referred to, 150, is affixed to a shaft 156 which extends through a central bore in shaft 155". One end of the shaft 156 is journaled in suitable bearings 159 in the rotor housing as clearly shown in Figure 7. Retraction and extension of the rotor shanks and arms is accomplished through rotary motion thereof, the motion of the worm 150 being a relative motion only. Thus, assuming in Figure 5 that the rotors are turning clockwise in their ordinary cutting operation, the worm and accompanying shaft 156 is rotated at the same speed. The worm is then, in effect, inoperative. When it is desired to retract the rotor shanks within the housing, the cutting operation of the arms is stopped and the housing, shanks and arms, rotated by shaft 155" in a reverse direction. If, during this reverse or counterclockwise rotation of the rotor assembly, the shaft 156 and its accompanying worm is stopped, the effect thereof will be a rotation, relative to casing 112, of that worm in a clockwise direction. Hence, continuous rotation of the rotor assembly counterclockwise with shaft 156 locked against motion, will cause the worm, in engaging the pinions 140 and 140' to be, in effect, rotated in the direction for retraction of said rotor shanks. A reverse procedure is employed for extension of such rotor shanks, i. e., when in collapsed condition, they are rotated in a clockwise direction, rotating therewith the worm and its shaft 156. If that shaft is now stopped, the effect is a counterclockwise rotation of the worm resulting in an opposite rotary motion of worm pinions 140 and 140' and in an extension of the rotor shanks and arms. In this operation, it is necessary to provide a clutch means which permits the worm to be stopped, as stated, during rotation of the rotor assembly, yet which will slip when the rotor shanks have reached their fully extended or retracted position. To this end, the mechanism now to be described is employed.

*Mechanism for expansion and retraction of rotor arms*

It is to be noted that the particular type of clutching arrangement now to be referred to is applicable only to the outboard rotor mechanism. Comparable clutching apparatus is employed to effectuate similar results with respect to the inboard rotors, and these are controlled by similar means, the apparatus being sufficiently altered to permit its accommodation in a different location with respect to such inboard rotors. The principle of clutch operation of the inboard rotors is, however, identical.

Referring to Figures 16 to 18, inclusive, it is seen that shaft 156 is engaged by means of a dog clutch connection to its counterpart, shaft 157. The end of shaft 156 is grooved across its diameter to receive a complementary tongue portion 158 on shaft 157. The opposite end of shaft 157 is fitted with a splined member 160 which remains in constant engagement with the teeth 161 of an internal spline 162. Thus, splined member 160 is adapted for axial reciprocation within internal gear 161. It is normally maintained in the position shown in Figure 16 by a thrust means in the form of a helical spring 165 which bears against the after surface of the splined member 160 and which is supported at its opposite end by a spring retainer 166 and ball 167 to permit it to freely rotate. This assembly is positioned within a suitable bushing 172 seated in the rear wall 19 of the main transmission housing, being retained in place in that bushing by bolts 173. The bushing itself is retained in the wall by a series of bolts 174. From the description given thus far, it is apparent that the spring means 165 will consistently exert thrust upon splined member 160 so as to keep shaft 157 in engagement, by means of the dog clutch, with shaft 156. Should the internal spline 162 be stopped, however, while shaft 156 is turning, the spring means permits reciprocation of spline member 160 and shaft 157 in such manner that the tongue 158 is permitted to successively slip past its complementary groove in shaft 156 when the rotor shanks have reached their maximum limits of extension or retraction. It will be appreciated that the internal spline 162 is freely rotatable within the bushing 172 and that such internal spline would normally continue to turn along with the main drive shaft 155" in normal cutting operation of the rotors. To this end, the internal spline 162 is journaled in a suitable manner in a bearing bushing 175, the latter mounted within bushing 172 in any well-known manner.

To stop rotation of the internal spline, splined member 160 and shafts 157 and 156, during rotation of the main drive shaft 155", an aperture 180 is formed in the side of the internal spline. In alignment with this aperture is a stop pin 181 which is positioned for slidable movement in a bore 183. The stop pin is mounted upon a stop rod 184 and the latter is fitted, next to the stop pin, with a helical spring, which tends to constantly exert thrust toward the pin to force it into the aperture 180. As shown in Figures 16 to 18, assuming shaft 155" is rotating, the position of the stop pin prevents rotation of shaft 157 and, accordingly, 156. Hence, with the shaft so stopped, the rotor shanks are extended or retracted in the manner already described. When they have reached their limitation of extension or retraction, however, shaft 156 will continue to rotate. The dog clutch then comes into play, projection 158 slipping over the complementary recess in the end of shaft 156. Such arrangement of parts provides a safety factor during extension or retraction of the rotor arms. When the said arms have reached their limits of either extension or retraction, the clutch mechanism just described permits slippage in the manner described so that damage to the mechanism is avoided. Ordinarily, as soon as the respective limits have been reached, the operator will inactivate the clutch by retraction of the stop pin from the aperture in the internal spline.

To control this engagement of the stop pin with the internal spline 162, a bar 192 is apertured at its forward end to receive the stop rod 184, the latter being threaded for reception of a bolt 185 to retain the bar 192 thereon. The rod 192 is provided with side slots 195 which are adapted to ride in a spring plate 193, the latter being secured as indicated in Figure 4 to the bushing 172 through the use of suitable bolts 194. The purpose of this spring plate is to maintain said bar 192 in operative position. This spring plate is also slotted so as to provide two arms 206 and 207 and these ride in said slots 195 of the bar. The said plate 193, made of metal having spring-like qualities, is sufficiently flexible to enable it to readily conform, without binding, to the arc of motion of bar 192 during actuation thereof. One end of the said bar 192 is pivoted or fulcrumed in a depression 200 formed in the back wall 19 of the casing. The opposite end of the said bar 192 is engaged (Figure 16) to the actuator rod 209 of a hydraulic slave unit 210. This unit is controlled by a master unit upon the operator's control panel. The master-slave assembly may be of a type well-known within the art, and need not be further described herein. As shown in this figure, the back wall 21 of the casing is recessed as at 205 to provide operative space for the elements just described.

It will be apparent that operation of the dog clutch can be discontinued by permitting shafts 156 and 157, spline 160 and internal spline 162 to freely rotate. Assuming the rotor mechanisms to be operating, this is done by retraction of the piston rod 209 by actuation of the slave unit 210. This will cause the stop pin 181 to be withdrawn from the opening 180 in the side wall of the internal spline 162. It will be appreciated that such aperture 180 is so located as to be aligned with the stop pin when said spline 162 is rotating. More than one such aperture in the internal spline can be utilized for for the purposes recited.

Briefly, the mechanism thus far described with respect to extension or retraction of the rotor shanks and arms is operated as follows, assuming that the rotor arms are in retracted position and that the operator desires to extend the same. Reference is made particularly to the starboard outboard rotor of Figure 5. The main drive is set in operation so that the drive shaft 155" rotates in a clockwise direction. The stop pin 181 is withdrawn from its operative position by actuation of the master-slave unit 210. As this point, the main drive shaft 155", its inner shaft 156, shaft 157, and the accompanying clutch mechanism, all are turning in a clockwise direction. The operator then actuates the slave unit 210 so as to cause engagement of the pin 181 with the aperture 180 in the internal spline 162. This stops rotation, through the dog clutch, of internal shaft 156. Consequently, although worm 150 is actually not in motion, the continued clockwise rotation of housing 112 results, in effect, and with respect to that housing, in a counterclockwise rotation of said worm 150. This causes the nuts 118 and 118' to ride inwardly toward the center of the rotor housing 112 carrying along with them the rotor shanks 110, which are thus extended. When these shanks reach their outermost position, as shown in Figure 7, they can be advanced no further since the shank nuts 118 and 118' have come in contact with worm wheels 140 and 140'. The shaft 155" is still driving the rotor housings at the same rate of speed. The resultant continuous rotary force or torque upon the inner shaft 156 forces the dog clutch to slip by longitudinal reciprocation, permitted by internal spline 162, thus disengaging shafts 156 and 157. As the shaft 156 turns and shaft 157 is retained in a stationary position, the slippage is accomplished by reciprocations of that shaft 157 within the internal spline in a manner which should be well understood.

As stated, this dog clutch system is necessary to prevent overloading of the several moving parts when the limits of extension or retraction of the rotor arms have been reached. After they have reached that point, the dog clutch automatically provides a safety feature through the automatic slippage just described. The operator may then disengage the stop member 181 from aperture 180 to prevent further actuation of the dog clutch. It will be understood that this description has been limited to a right-hand outboard rotor designed for clockwise rotation in cutting.

It should be further understood that the mechanism of the left-hand outboard rotor, or, referring to Figure 2, the rotor D thereof, is substantially the same as that just described. Viewing the mechanism comprising our invention from the after end thereof or looking toward the front of the machine from where the operator is positioned, the two left-hand rotors rotate in a counterclockwise direction and the two right-hand rotors rotate in a clockwise direction for reasons which have hereinbefore been stated. All of the rotor shanks and arms may be extended or retracted when all of the said rotors are rotating for cutting purposes. The clutch mechanism which has just been described is a clutch mechanism specific to rotors A and D, Figure 2. The mechanism of these two rotors is identical even though they do not function in the same operational direction. Thus, in each case, the helix angle of the respective worms and direction of threading of members 117 and 117' is identical. Hence, assuming that the rotor arms of both rotors A and D to be in collapsed or retracted position, rotor A having a clockwise movement and rotor D, a counterclockwise movement, the activation of the clutch mechanism just described produces the same effect upon the rotor shanks and arms of each of the said rotors A and D. In each case, the threaded nut elements 118 and 118' are caused to traverse that distance from their outer positions within the casing 112 to the positions shown in Figure 7. Retraction and extension of the rotor bars may be accomplished in unison by the operator despite the fact that one pair of rotors (the right-hand rotors) are rotating in a direction opposite to the direction of rotation of the opposite pair of rotors (the left-hand rotors).

A clutch mechanism similar to the foregoing is employed to accomplish the retraction and extension of the inboard rotors. Referring particularly to Figure 13, it is seen that this figure discloses the left-hand inboard rotor (viewed from the rear, or operator's position) wherein the cutting operation is obtained by a counterclockwise rotation of the rotor. The worm 150 is threaded in the same manner as that shown in Figure 7, and as hereinbefore described in order that retraction and extension of the rotor shanks may be made either singly or in unison with the other rotors.

By reference to Figure 13, it will be seen that the shafts 156 and 157 and spline 160 are all the same as that which has been described. However, the internal spline 220, having internal teeth 222, is also provided with external gear teeth 221. That spline is journaled in a suitable bushing 224 which is supported upon an upright 223. The spring member 165 performs the same function, as in the previous explanation of clutch operation of rotor A, of exerting thrust upon the spline 160 in a forward direction, the latter element being adapted to reciprocate horizontally in engagement with the internal teeth 222 of spline 221. Referring to Figure 15, shaft 231 is journaled in the support 223 in such manner that the shaft 231 may be reciprocated longitudinally. The opposite end of shaft 231 is journaled, as at 232, in the back wall 21 of the transmission housing. The shaft is journaled in the back wall in any suitable manner, such as by a sliding key, permitting reciprocation therein but preventing rotary motion thereof. The shaft is provided with a pinion 230 firmly affixed thereto, said pinion having teeth adapted for engagement with the external teeth 221 of the internal spline. The shaft 231 is pivoted at 235 and 236 so that it may come into ready alignment with piston rod 237 of a slave unit 238. It will be noted that both internal spline 220 and the pinion 230 are located upon the support 223 in such fashion that forward motion of the pinion 230 will cause the teeth thereof to mesh with the external teeth 221 of the internal spline. This motion is obtained by activation of the master-slave unit. Its reverse action causes disengagement of these two pinions. Accordingly, this means enables the operator, during rotation of the rotor assembly, to stop rotation of shaft 156 by intermeshing teeth of pinion 230 with the external teeth of spline member 220. As has heretofore been explained, shaft 156 normally rotates with the rotor assembly. When it stops and the assembly continues to rotate, stoppage of motion of shaft 156 by means just described causes, in effect and with respect to the rotor assembly, a counter-rotation of shaft 156 in a direction opposite to that of the said assembly. Both of the inboard rotor assemblies are provided with this identical clutch means. However, it has been observed that these two inboard rotors rotate in opposite directions. Referring to Figure 13, the rotor is shown for a left-hand inboard rotor (rotor C of Figure 2) with counterclockwise motion for cutting. However, the clutch mechanism just described, and applicable to these two inboard rotors, is identical with respect to each of them.

Thus, all four rotors are provided with similar mechanism, the function of which is the same. The operator may, through control of the master-slave units hereinbefore described, cause retraction or extension of the rotor arms by a single operation. Mechanism for extension or retraction simply utilizes the rotary motion of the rotor assemblies in a simple and effective manner without requiring additional motors or power supply.

*Main drive transmissions for rotors*

Referring to Figure 4, it will be seen that the outboard rotors are each driven through a separate transmission, whereas the two inboard rotors are driven through a single transmission. The inboard rotors are synchronized and the outboard rotors are not. Synchronization of the inboard rotors is essential since they are placed so closely together that normal cutting operation thereof would be impossible without synchronization. Accordingly, both of these inboard rotors are powered from a single motor source, and both are driven through a common gear train. Synchronization of the outboard rotors is not required, since they are located back of the central rotors, and when the end transmission boxes are extended, ample space is provided for rotary cutting movement thereof.

All of the transmission and gearing for propulsion of the inboard rotors is located within the main transmission housing having a back wall 21 and a forward wall 250. The rotors are, of course, mounted upon the front wall 250. Each of the four rotors herein disclosed are driven, as stated, by shafts such as that shown at 155 and these are supported in casings 252, all of which are substantially similar. The two inboard rotor shafts and casings 252 therefor are substantially longer than the casings and shafts of the outboard rotors as will be seen by reference to Figure 4. The reasons for this have heretofore been explained. As respects the inboard rotor assemblies, these casings are bolted to the front wall 250 of the main transmission housing. The two outboard rotor assemblies, through casings 252 are affixed to the front wall of the two sliding end transmission boxes. Bolts 261 are provided for affixing these casings to the respective front walls in a manner which should be readily understood.

Each of the drive shafts of the four rotor assemblies are supported within these casings in an identical manner. Each shaft rides upon two anti-friction roller thrust bearings 265 and 266, one of which is located immediately adjacent the rotor assembly and the other one of which is located adjacent the gear transmission housing. Both of these thrust bearings are of common type, preferably of the roller bearing type. They are brought into alignment and within the desired tolerance by lock nuts 270 and 272 between which is positioned an ordinary form of lock washer 271. These thrust bearings provide the main support for the shafts 155 throughout their length. It has been found desirable to also provide an oil seal 275, in the form of an hydraulic O ring, as a means of preventing accumulation of dirt or other foreign matter into these bearing races and the space surrounding the shaft between the races.

As stated, the inboard rotors are synchronized with respect to each other and are driven by means of a hydraulic motor 20. This motor as embodied in the preferred embodiment is of conventional type. The motor operates a gear train to accomplish the synchronized drive of two inboard rotors. It has been found that with an average operating speed of the motor of 850 R. P. M., and a gear train accomplishing gear reduction of 34 to 1, a satisfactory cutting speed of the rotors of approximately 25 R. P. M. is obtained. This gear train for driving the inboard rotor assemblies will now be more particularly described.

Referring to Figures 4, 11 and 12, it is seen that the drive shaft of the motor 20 is provided with a flexible coupling 280 and the latter interconnected with the main drive pinion 282. This pinion engages a larger gear 284 which positively drives a smaller pinion 286 mounted upon the same shaft. The latter meshes with a large gear 288 and this gear is keyed to a smaller pinion 290, furnishing power to an additional pinion 292. Pinion 292 is keyed to a shaft so as to drive an additional spur gear 294 which, in turn, provides power for driving two idler gears 296 and 298. These idlers are intermediate the two inboard rotors and each of them provide the direct drive to the shafts of said rotors. Thus, gear 302 is keyed to the main shaft 155 of the left inboard rotor, or that rotor which ordinarily rotates in a counterclockwise direction, and gear 304 is keyed to the drive shaft 155' of the right-hand inboard rotor or that rotor adapted for clockwise movement.

The drive pinion 282 idles upon shaft 289, gear 284 and 286 both being keyed to a common shaft 285. Intermediate or idler gear 298 is mounted upon this same shaft 285, but for free rotation thereon. Both gear 288 and pinion 290 are keyed to a common shaft 289. This shaft 289 is suitably journaled in two bearing supports 310 and 312, both of which, referring particularly to Figure 4, are affixed in any suitable manner (here shown as being bolted) to the base plate 11 of the main housing within which this transmission mechanism is positioned. Pinions 292 and 294 are also suitably keyed to a common shaft 293. It has already been stated that idler gear 298 loosely rotates upon shaft 285; and its counterpart 296 is also journaled for free rotation upon a shaft 299 which is supported by the front wall 250 of the main or front casing.

From the foregoing description of this gear train, it will be seen that as motor 20 drives the pinion 282 in a counterclockwise direction, the result will be not only an effective reduction gear train but also a drive wherein the inboard right-hand rotor is driven in a clockwise direction for the normal cutting operation, and the inboard left-hand rotor is driven in a counterclockwise cutting direction. It is evident that when these gears are initially positioned in the manner described, the inboard rotors are placed in the relative positions shown in Figures 2 and 3, or in other words, right angularly disposed with respect to each other. The positive drive of this gear train synchronizes these rotors in the same relative position despite the counterrotation thereof with respect to each other. The rotors are thus synchronized at all times in the operation of this mechanism. It will be appreciated that the four gears 296, 298, 302 and 304 are driven through a single pinion 294 and, since they are all of the same diameter, will cause rotation of the two shafts 155 and 155' at the same constant rate of speed.

Reference will now be made to the gear train for driving the two outboard rotors. These rotor assemblies are not synchronized for, as stated, in their outboard or extended positions, sufficient space is provided for cutting rotation of the rotor arms without conflict with the inboard rotors or rotor casings 252. Accordingly, the drives of these outboard rotors may be entirely separate and each of them powered by its own motor. Referring to Figure 4, it will be seen that the outboard left-hand rotor is powered by motor 22 and the right-hand outboard rotor, by motor 23. The motors here used are hydraulic motors of the multi-piston type. These transmissions for the outboard rotors are mounted within the end casings or slidable end boxes, a specific description of which will be referred to hereinafter. Each of these motors, for propulsion of each gear train, is affixed to, and rides with, each end box or casing as it reciprocates to and from its outermost or extended position. Suitable slots 345 and 346 (Figure 11) in the back wall 21 of the main transmission housing permit such movement.

The two gear trains providing reduction gearing for the said motors 22 and 23 are identical to each other and, accordingly, description herein will be limited to the gear train or transmission shown in Figure 4 of the right-hand outboard rotor. Each of the transmissions provides for reduction gearing to accomplish a ratio of approximately 34 to 1. Accordingly, assuming the R. P. M. of the motor 23 to be 850, this ratio is such that the cutting rotation of these outboard rotors approximates 25 R. P. M., or the same rate of speed as that of the inboard rotors. Specific characteristics of individual gears as utilized in the preferred embodiment of the invention are not herein given, since obviously various means to obtain the desired ratio are well-known to those skilled in the art.

As shown in Figure 4, the drive shaft 340 of the motor 23 is fitted with a main drive pinion 341. One side of the gear train is mounted upon the rotor drive shaft 155'', or primary shaft, as will be seen by reference to Figure 5. The other side of the gear train is mounted upon a countershaft 352 suitably journaled in the front and back walls of the starboard end transmission housing. The gear train comprising the transmission is in part formed of four cluster gears, two of which are mounted upon the primary drive shaft 155'' and two of which rotate upon the countershaft 352. Thus, referring to Figure 4, the countershaft 352 is provided with a cluster gear comprising a spur gear 320 and a pinion gear 324 integral therewith; it is also supplied with a cluster gear comprising a spur gear 322 having integrally formed therewith a pinion gear 326. These two cluster gears just described are the counterpart of the two similar cluster gears which are mounted upon the primary or main drive shaft 155''. Referring to Figure 5 of the drawings, that shaft is fitted with a cluster gear comprising a spur gear 328 having a pinion 332 integrally formed therewith; and a cluster gear comprising a spur gear 330 and a pinion 334 also integral therewith. Referring again to Figure 4, it is now seen that the main drive pinion 341 meshes with the spur gear 328 and power is transmitted in an obvious manner through the following gears in the sequence named: 332, 320, 330, 324, 334, 322, 326 and 350. The driving gear 350 is securely keyed to the main rotor shaft 155'' in a well-known manner and supplies power for driving the entire rotor casing and its accompanying rotor arms. It is, of course, apparent that all of the gears in this gear train from 328 to 326, inclusive, and in the order named in the foregoing, are mounted for free rotation upon their respective shafts 155 and 352. Both the shaft 155'' and countershaft 352 supporting these intermediate gears are also provided with suitable bearing bushings such as that indicated at 355, Figure 4.

Referring to Figure 4, it will be seen that with motor 23 and drive pinion 341 having clockwise rotation, the result is to force rotation, at a reduced speed ratio, to gear 350, also clockwise. This results in clockwise rotation of the rotor arms and cutting elements mounted thereon. Thus, the oppositely rotated gear train or that provided for the outboard left-hand rotor is powered for normal cutting action by motor 22 operated in a reverse or counterclockwise direction for reverse rotation of the rotor assembly. Reference should be made to Figures 11 and 12 for further understanding of the nature of the gear trains here employed to afford power to each of the outboard rotors. It is, of course, obvious that these gear trains may be modified by those skilled in the art, that the ratios thereof may be varied, and that they may be assembled in a manner to accommodate motors of varying horsepower. However, we have found in the preferred embodiment of this invention that the gear trains here disclosed are of a ratio which is desirable for efficient cutting action of the rotor arms at the R. P. M. indicated. Thus, other details as to the specific type and size of the gears here described are not set forth as this constitutes subject matter well within the knowledge of those skilled in the art.

*Mechanism for extension and retraction laterally of outboard rotor assembly*

As hereinbefore stated, the outboard rotors including the drive transmissions therefor may be extended laterally a substantial distance beyond the main transmission housing within which the end boxes, containing the transmissions for these rotors, are housed. In the preferred embodiment of the invention, these end rotor boxes, including the rotor assemblies attached to each, may be moved a distance of 12'' outwardly from the position shown in Figures 11 and 12. As assembled in the preferred embodiment hereof, this entire mechanism has an over-all width of 7' in collapsed position. Thus, by extension of the end rotor boxes 12'', the width is increased 12'' upon each side or to an over-all cutting width of 8'3''. In such a mechanism, it is thus apparent that with the rotor arms retracted, a kerf 28'' in height and approximately 7' plus one rotor diameter, or approximately 9'2'', in width may be mined. With the rotor shanks and arms in extended position, and with the end transmission boxes supporting the outboard rotors in extended position, the mechanism is adapted to cut a kerf 38'' in height and approximately 10'2'' in width.

Now, referring particularly to Figures 11 and 12, it is to be noted that each of these end rotor transmission boxes are of the same dimensions and characteristics. The right-hand outboard rotor transmission housing has side walls 360, 361, top 362 and base 363. The numerals 360', 361', 362' and 363' designate these same parts with respect to the left-hand housing. Viewing Figure 12, both of these housings are adapted to move slidably and laterally within the frame of the main transmission housing shown in section in Figures 11 and 12, where 11 is the base and 17 is the top thereof. Both top and bottom of each of these end boxes or sliding casings are provided with male dovetails 371 and 373 adapted to engage suitable female dovetails in the top 17 and the bottom 11 of the main transmission housing. (See Figures 5 and 13.) These latter dovetails are indicated respectively in Figure 13 at 372 and 374. It will be noted that the location of these several dovetails, and their configuration is such, as to practically eliminate deflection, which would normally tend to occur due to the weight of the rotors extending forwardly. It should further be apparent by the very nature of the shape of the said dovetail interconnections that the end casing, can only slide laterally without substantial movement in any other direction. As a further means of assuring proper alignment of these end transmission boxes, both the left-hand and right-hand rotor shaft casings 252 are made with a downwardly extended edge 375 which terminates even with the surface of the bottom 11 of the main transmission casing.

Referring particularly to Figure 4, provision has been made to seal the forward opening which is caused by extension of the end transmission casings laterally. Thus, hinges 380 are positioned between the main transmission housing and these end boxes in the manner shown in this figure. When the end transmission boxes are extended, these hinges assume the position shown in dotted line at 381 and substantially and effectively afford a seal across the forward face of the mechanism which would otherwise be left open to be contaminated by coal particles or other foreign matter. This seal is important since the lateral threaded member, to be later described, which forces the end boxes outwardly, would otherwise be exposed. The hinges are mounted in an appropriate space 383 between the side wall of the main casing and the end boxes. This space is provided for by an offset portion 382 in the inner side walls 361 and 361' of the end boxes. This construction is identical with respect to both sides of the mechanism.

Further sealing means, designed as protection to the expanding mechanism when the two end boxes are extended laterally, is found in the provision of the inwardly and laterally extending top plates 385 and 386 (Figures 11 and 12) which are simply extensions of the two tops 362 and 362' of each of the end transmission housings. As shown in Figure 12, these plates extend inwardly a considerable distance and preferably a substantially greater distance than the amount of extension of the rotor end boxes. These plates bear closely against the inner surface of the top 17. Thus, when the rotor transmission casings are extended laterally, they not only provide an effective seal, with the said top, but also offer substantial additional support and rigidity to the two end transmission boxes in their extended positions.

All of the transmission gearing for propulsion of these end transmission boxes outwardly or inwardly is located within the main transmission housing, as will be seen by reference to Figure 4. This expansion and retraction mechanism is driven by an additional fluid motor 390 which is conventional, and known in the art. It is firmly affixed to the bearing support 391 (Figure 13) within which the drive shaft of the motor may be journaled. Preferably one or more anti-friction ball bearing races 392 are positioned within the support and the shaft journaled therein for obvious purposes. The bearing support itself is affixed to the inner back wall 21 of the main transmission housing. The shaft of the motor is keyed, splined or otherwise affixed to a sprocket pinion 394 adapted to drive a sprocket chain 395 and, in turn, a sprocket gear 393. The latter is keyed to a shaft 392 upon which is also affixed a worm 396 (Figure 14). This worm engages a worm wheel 397 and the latter, through a suitable drive shaft 399, drives a spur gear 398. A gear 400 meshes with the spur gear 398 and by its rotation propels a lateral screw shaft 415 threaded at each end thereof.

The shaft 399 is journaled in an upright member 402 secured by any suitable means to the base 11. A forked bearing support 401 is also supported by member 402 and suitably bolted thereto. This forked bearing support is provided with two upright arms 406 and 408 in which is journaled the shaft supporting the worm and the large sprocket gear 393. Thus, the shaft 392 supporting these two gear elements is journaled in an obvious manner in the two uprights of the yoke member 401. As heretofore explained, the gear 400 is meshed with the spur gear 398 for rotation of a lateral screw member 415. Gear 400 is keyed or splined to this screw member and the latter is journaled in two upright members 403 and 492 which are here illustrated as supplied with bearing mounts 407 and 409 rotatably positioned in the base 11, to permit self-alignment of uprights 406 and 403. These mounts are secured to the base through the use of suitable snap rings in an obvious manner (Figure 11). Each of the end casings or boxes are provided at their inner sides 361 and 361', respectively, with nuts 420 and 421 which are relatively long and internally threaded or tapped. The screw member 415 is threaded at each of its ends, the threads running upon opposite hands. As here shown, shaft 415 has a right-hand thread 416 upon one end and a left-hand thread 417 upon its opposite end. These threads engage the nut members 420 and 421 in an obvious manner. The latter elements are also provided with enlarged shoulders or flanges 418 and 419 and a series of bolts 422 secure these flanges to the inner side of each end transmission box. Thus, movement of the nuts outwardly causes a consequent movement of the end boxes outwardly; and a reverse movement inwardly propels these end boxes, together with the transmission equipment located therein, inwardly. Referring particularly to Figures 11 to 14, inclusive, it is seen that actuation of motor 390 to cause a clockwise rotation of the sprocket 394 provides a drive through the gearing just described to extend or slide the end casings supporting the outboard rotors to their outermost positions; and, conversely, reversal of direction of motor 390 will cause these end boxes to traverse that same distance inwardly to the position shown in Figures 11 and 12.

Some means must be provided to stop movement of the end boxes outwardly when they have reached the predetermined distance of extension which, in the preferred embodiment of the invention, has been indicated as a distance of 12" from the respective starting points. To this end, two stop pins 430 are positioned upon the rear wall 19 of each of these end casings (see Figure 4). These pins are suitably located to stop travel of the end boxes outwardly at a predetermined distance. Accordingly, when they have traversed this distance, the pins engage the said end wall and no further movement is possible. It will be understood that this entire mechanism is driven by fluid motors and in this particular instance, by fluid motor 390. Accordingly, some means must be employed to relieve the pressure of the system when it exceeds a predetermined amount resultant from stopping travel of the end casings the desired distance. This means comprises a fluid bypass set at a predetermined overload point so that when the outermost point of extension has been reached, this bypass will relieve further accumulation of hydraulic pressure in the system. For example, if hydraulic force of 600 lbs. p. s. i. is necessary or desirable to expand these end casings in the manner described, the relief valve means provided for motor 390 could be set at 620 p. s. i. At full expansion, stop pins 430 are contacted and the normal pressure for operation of this mechanism would thereby increase. When this pressure reaches 620 lbs., it would be released by operation of the relief valve, and such bypassing of fluid due to excessive pressure continues as long as these casings remain in the extended position. By reversal of direction of flow of the hydraulic fluid or direction of the fluid motor 390, the mechanism is operated in the reverse direction and the end boxes caused to contract until they necessarily reach their respective center limits. Here again, pressure is increased until it reaches the predetermined point of, for example, 620 p. s. i. and the relief valve mechanism automatically provides for hydraulic fluid bypass. This type of relief valve is per se well known to those skilled in the art and, accordingly, no further specific disclosure is necessary. Such a system is a safety feature, providing for bypass of the fluid should the operator not promptly stop travel outwardly when the desired extension has been reached.

*Tractor carriage for support and thrust of rotor assemblies*

Referring particularly to Figures 19a to 22, inclusive, it will be seen that the rotor cutting mechanism of this invention is mounted upon a device of tractor type, utilizing treads 35 for forward as well as rearward motion. These treads are driven upon two tread frames generally indicated at 450 and 450' upon each side of the mechanism. Each of the tread supporting frames are comprised of two longitudinal members such as 451 and 452 upon the right-hand or starboard side of the machine and 451' and 452' upon the opposite side thereof. These frames are separated by intervening transverse bulkheads 453, 454, 455, 456 and 457, with respect to the frame 450; and such bulkheads as indicated at 453', 454' and 455' upon the opposite frame 450'. It will be understood that all of such transverse bulkheads such as referred to are not all specifically designated but these are positioned throughout the length of these two main frames in such manner as to also afford suitable partitions for such mechanisms as the motor control boxes 50 and 51, the primary electric motor 42 and other apparatus previously described.

The main chassis frames 450 and 450' are separated by a base plate 500 as well as transverse means such as 501, 502, 503 and 504. As indicated in Figure 23, this base plate terminates in an angularly inclined and upwardly extending portion 501'. Such transverse means are positioned within these frames in a manner well known to the art, such as by welding, riveting, etc. The beams 501 to 504 also support the bottom plate 505 of the conveyor mechanism, which may also be affixed to members 452 and 452'.

Both of these frames 450 and 451 are identical in structure and further description thereof will accordingly be limited to frame 450, as shown in Figure 19a. This frame terminates at its forward end in a supporting trunnion comprised of forwardly extending members 453' and 454' as well as two intermediate forwardly extending members 481 and 482. The elements just described are adapted to support pivots 484 and 485 which in turn are the mounts for the rotor blade supporting bars 29 and 29'. Also, this trunnion is provided with a wheel bearing element generally indicated at 480 and including members 486 and 487. The wheel support 480 (Figure 21) is provided at its forward end with suitable trackways for engagement with a slidable wheel bearing element 472. Of course, sprocket wheels 460 and 462 at each end of these main frames are suitably journaled on bearings 470 and 471 in a manner well-known in the art. Such sprocket wheels are driven through power supplied to the rearward wheels 462 and that power delivered to the treads 35 through such means as peripheral lugs 461 adapted to engage treads of the link and lug type in a manner shown in Figure 19a.

It will be understood that in tractor mechanisms of this type, the forward pair of wheels are mounted for reciprocation in the slides of the element 480 in order that a tightening device may be employed to take up slack in such treads. This device consists of an extension 473 upon the sliding bearing 472 threaded at its end to receive a screw element 474 which terminates in a spring receiving bushing 475. A helical spring 476 positioned against the bulkhead 453 as shown in Figure 19a tends to exert forward thrust upon the said bushing and consequent forward thrust upon the wheel bearing and the wheel itself. Amount of thrust may be adjusted by the screw element 474 by extending or retracting the same with respect to said sliding bearing 472. As herein shown, the take-up device just described is employed only with respect to the forward wheels.

Referring to Figure 19b, it will be seen, as stated, that two motors 36 on each side of the machine provide propulsion for the rear wheels 462 and consequently both treads. These motors are adapted to drive suitable reduction gear transmissions 490 and 491 which are directly engaged with the said wheels. Both of these transmissions are herein diagrammatically indicated (see Figure 19b) since they are of commercial type, and such mechanisms, well-known within the art, form no part of the instant invention. However, these motors are separately controlled so that by actuating the treads upon one side only of the machine, the machine may be caused to turn to the right or left.

The various equipment which is located on each side of the mechanism and between each of the treads, such as the motors, both electric and hydraulic, motor controls, and related apparatus, has already been referred to.

The operator's pallet is preferably formed of suitable fabric. This is stretched upon a rectangular frame 512. At its after end, said frame is provided with lugs 515. These are pivoted upon a transverse fulcrum or pivot 516 which is secured in any ordinary manner to the main chassis frame of the mechanism. At its forward end, the frame 512 is provided with pairs of lugs 518 between which are mounted the hydraulic cylinders 56 and 56'. These pistons at their opposite ends are also pivoted to lugs 519 secured to the base of the main chassis frame 500. The function of this type of operator's pallet should be self-evident. Upon extension of the hydraulic pistons 56 and 56' through suitable controls, the forward end of the pallet is lifted to assume a position of greater incline than that indicated in Figure 23, wherein said pallet is located in its most horizontal position. The frame thus pivots about one end thereof and may be raised and lowered within the desires of the operator. The pallet is, of course, located adjacent the control panels 52 and 520 so that such controls are readily convenient to the operator.

Referring to Figure 19a, the top plate 17, which surmounts the transmission assemblies and expansion and retraction mechanism for the outboard rotor assemblies, extends rearwardly a considerable distance. At its after end, it is suitably joined to an additional top plate 510 which substantially covers the forward end of the conveyor mechanism. It will be noted that these plates are provided with an opening 513 to provide space for the hydraulic motor 20 as well as to permit convenient access thereto.

*Elevator for transmission assemblies and scraper blade actuation*

The main transmission housing, affording support for the described rotor assemblies, is positioned for vertical movement to enable alteration of either the size of kerf or the height of kerf above room floor. Increase in height or size of kerf necessitates increase in height above room floor of the axis of rotation of the cutting elements. Also, it is desirable to provide for elevation to cut the roof, and to enable the cutting mechanism to follow a swell in the room floor. To this end, the said transmission housing with its accompanying parts, including the rotor assemblies and transmissions therefor, is mounted upon two elevator bars 30 which extend rearwardly from said casing. These two bars are affixed in any suitable manner, as by bolts, to elements 30b (Figure 1) which elements are, in turn, secured to the rear wall 21 of the described transmission casing. It will be noted that the elevator bars 30, at their point of connection to the elements 30b, are widened as at 30a so as to bear against the entire back surface 21 of this main transmission casing, thereby providing additional bolting surface. These two elevator bars 30 are exactly the same with respect to their component parts and manner of function and, accordingly, description hereof is limited substantially to the elevator bar shown in Figure 1 or that bar upon the left-hand side of the mechanism. (See Figures 19a and 20a.) Each bar is fitted with two fish plates at its forward end, 550 and 550', mounted upon opposite sides thereof; and, similarly, fish plates 551 and 551' are mounted at the after end of said elevator bars on each side thereof. Referring now to Figure 20a, it will be seen that the forward fish plates are pivoted as at 549 to a downwardly extending link 552 and the latter, in turn, is pivoted to the bottom 500 of the main chassis frame by means of a suitable pivot and pivot support. The fish plates 551 and 551' are provided with lugs 555 fitted with pivot 557 to pivotally engage another downwardly extending link 556. The latter is pivoted in a base plate 565 which is also secured to the bottom 500 of the main chassis frame. The after fish plates 551 and 551' are also fabricated with additional downwardly extending lugs 558 between which is positioned a pivot pin 559 in a well-known manner. These pivot pins 557 and 559 are adapted to be interconnected to the piston rods 570 and 571 of two hydraulic cylinders 31 and 31'. The latter have swivel pins upon the bottom extremities thereof for pivotal mounting in bases 560 and 561 which are also suitably secured to the main chassis floor 500. Thus, it will be seen that the aforesaid pistons, two on each of the elevator bars, enable raising and lowering of the entire cutting mechanism of the invention in a manner which should be readily apparent. As shown in Figure 20a, these elevator bars with the accompanying transmission assembly is illustrated in its raised position. In such position, the hydraulic cylinders 31 and 31' have been actuated to extend the piston rods thereof and the entire assembly is pivoted or extended upwardly upon the links 552 and 556, the latter together with floor 500 and elevator bars 30 forming a parallelogram in this position. In the preferred embodiment of this invention, the over-all increase in height accomplished by such combination of elements is in the neighborhood of 5″. This increase permits not only raising the height of cut but also permits the increase in cutting diameter of the assemblies.

This raising and lowering of the main transmission assembly and the cutting mechanisms associated therewith may also be accompanied by the raising or lowering of the scraper blade apparatus. The latter, however, may be independently raised or lowered to accommodate different conditions such as the desired clearance between floor and scraper blades, and positioning of the same to overcome irregularities or obstructions in the floor. In this respect, a primary purpose of the scraper blade elevating mechanism is to permit leveling of the floor, or following the seam variation by bulldozing the floor, thus creating flexibility of mining practice. A further adjustment in the scraper blades may also be made in the apparatus of our invention. That is the ability of the mechanism to extend the outboard scraper blades laterally a substantial distance. This is desirable as a function which permits the scraper blades to equal with exactitude the overall width of the rotor mechanism in its extended position, as hereinbefore described. These optional movements of the scraper blades are accomplished by the following related elements.

Referring to Figure 19a, it will be seen that the broken away section is illustrative of the manner in which the scraper blades are moved vertically or horizontally. Since both of the outboard movable blades are identical to each other with respect to the mechanism to be described, reference will be primarily made to the operating features of the right-hand movable scraper blade or the one designated 24 herein.

The pivots 484 and 485 have hereinbefore been discussed with relation to their location in the wheel supporting trunnion of the tractor mechanism. These pins pivotally support two scraper blade elevating bars 520 and 521. The supporting members 29 and 29' which support the blades themselves are offset from the elements 520 and 521 in the manner illustrated. The same construction prevails upon the opposite side of the machine wherein the blade supporting elements are identified as 29″ and 29‴. The central or middle scraper blade 25 is welded or otherwise affixed to the inboard supporting members 29' and 29″ in such manner that as these elements pivot about the pivots 484 and 485, that middle blade is also pivoted or raised and lowered accordingly. On each side of this mechanism is also affixed outboard scraper blade supports and these appear in Figures 20a and 22 at 531. Such supports are welded (referring to the right-hand scraper blade assembly) to the elements 29 and 29'. They are inclined the same amount as the scraper blades 24 and positioned immediately adjacent thereto. Each of these scraper blade supports 531 is slotted to receive a tongue 535 and the latter is securely affixed to the scraper blade proper 24 by a series of bolts 536 as shown in Figure 19a. These slots run throughout the length of the element 531. As herein shown, the tongues 535 are of L shape so that the scraper blades 24 and 24' may freely reciprocate within the aforesaid slots but are retained securely against the face of the inner supporting member 531.

Both of the outboard scraper blades are positioned angularly with respect to the transverse axis of the mechanism in order that the scooping effect thereof is more pronounced. Referring to Figure 19a, it will appear that the angle utilized approximates 4° from the transverse axis.

From the foregoing, it is apparent that each of the outboard scraper blades as well as the middle scraper blade is freely pivoted about pivots such as those illustrated at 484 and 485. Pivotal movement is obtained by a series of hydraulic pistons 28, 529, 530' and 531'; two of these pistons are adapted for operative pivotal movement of each scraper blade. Thus, pistons 28 and 529 are pivoted at one end thereof or at 540 and 541 in a manner well-known in the art to the right-hand outboard scraper blade. Similarly, pistons 530' and 531' are pivoted at 542 and 543 to the opposite movable scraper blade. Also, these series of hydraulic thrust devices are pivoted at their opposite ends; thus, pistons 28 and 529 are pivoted at 544 and 546 to the members 29 and 29' and pistons 530' and 531' are pivoted at 547 and 548 to the corresponding members 29″ and 29‴. These pistons will normally be actuated in unison in order that all of the blades may be raised and lowered with equal force upon each side thereof, it being understood that through the attachment of the middle scraper blade to the elements 29' and 29″, the middle scraper blade is lifted or lowered corresponding to the movement imparted to the outboard blades.

As stated, these outboard blades are adapted for reciprocation in order that they may be extended a substantial distance beyond the over-all width of the tractor mechanism. This also is accomplished through the use of hydraulic pistons 27 and 27'. These are located just behind the scraper blade supporting members 531 and attached to the sides of the outer scraper blades. Thus, piston 27 is pivoted at 498 to the side of scraper blade 24, a suitable opening 499 being provided therefor. An opening 540 in the element 29 is also necessitated to permit reciprocation of the piston rod therein. The piston is pivotally mounted at 496, the opposite end thereof to a lug 495 upon the inner wall or face of the opposite member 29'. Similarly, identical apparatus to the foregoing is provided with respect to the opposite outboard scraper blade. Here the piston rod is pivoted at 498' through a suitable opening 499' in the side wall of the scraper blade and the element 29 apertured at 540' to permit reciprocation of the piston rod. A lug 495' at the opposite end of the piston provides a pivot support at that end.

From the foregoing description, the operating means for raising and lowering, as well as extending and retracting, the scraper blades, should be readily apparent. For example, upon actuation of the hydraulic cylinders 28, 529, 530' and 531', all three of the scraper blades are simultaneously raised above the level shown in solid line in Figure 21 to the position P in dotted line in that same figure. Retraction on the same cylinders lowers these elements to their former positions. Extension of the outboard scraper blades is accomplished by actuation of pistons 27 and 27'. As shown in the figures referred to, these scraper blades are shown in their retracted position, but upon actuation of the said pistons, thrust of the respective piston rods forces these blades outwardly as they securely ride upon the tenons 535 in the slot of the blade supports 531. Here again actuation of these pistons to extend the side scraper blades would normally be accomplished in unison, the relative positions thereof when extended being indicated in dotted line at P', Figure 22.

It is further desirable to provide some means preventing mined coal from being forced over the said blades so as to fall in the direct path of the treads. Thus, shroud plates 565 (Figure 21) are positioned above each side scraper blade. These plates 565 are pivoted, as at 566, to the elevator bars 30 and adjacent supports 30b in such manner that the opposite ends thereof rest upon the face of the scraper blades. With actuation of the blades upwardly or downwardly, these shroud blades pivot accordingly in an obvious manner, and, in sealing the space between the main transmission housing and the scraper blades, additionally force the mined coal toward the center of the mechanism to be picked up by the conveyor, as well as prevent coal from filling the space between blades and transmission housing.

Conveyor and thruster mechanism

Conveyor belting used with this invention is of conventional type and, as indicated at 655, comprises a chain and flight assembly. The belting is adapted to move forwardly upon the bottom conveyor plate 506 and to be propelled rearwardly upon the upper conveyor plate 650 which, with the sides 651 and 652, comprise a trough. As the coal is mined, it is apparent that it is conveyed by the rotor motion of the mechanism to the central part thereof and is scooped upwardly and inwardly by the scraper blades and shroud plates until it contacts the forward portion of the conveyor mechanism and by the latter, the mined coal is conveyed to the rear of the machine. At its inby end, the conveyor belting moves about a transverse member 655' which may be a rotatable shaft secured in suitable bushings 656 which are affixed to each of the movable frame members 29' and 29". Thus, as these frame members are pivoted for upward or downward positioning of the scraper blades, this transverse bar 655 will be propelled accordingly. It will be noted that the side plates 651 and 652 of the said trough terminate at 609. The bottom plate 506 terminates at 509 and meets an adjacent bottom plate 507 and the side plates 651 and 652 are positioned adjacent continuing side plates 651', 652'. The bottom plates are pivoted at their point of interconnection in any well-known manner. Similarly, the trough side plates are pivoted as at 657. This permits the after part of the trough conveyor means to be swiveled upwardly or downwardly to vary the height of the delivery end of the conveyor mechanism. Such swiveling is accomplished by the use of hydraulic cylinders 675 and 675' pivoted in the usual manner to a transverse frame member 506 which is provided with lugs 681 for this purpose. Such cylinders are pivoted at their opposite ends at 678 to lugs 680 attached to a beam 670 mounted upon the underside of the bottom plate 507 and providing support therefor. As shown in Figure 20b, this extension means for the back end of the conveyor mechanism is in parallel relation with the plane of the forward end thereof. However, extension of hydraulic cylinders 675 and 675' exert thrust upon the beam 670 and, consequently, a lifting action upon the tail of the conveyor mechanism which is then caused to swivel in a well-understood manner about the pivot 657.

The conveyor trough terminates in a tail piece 658 to which is attached a trough conveyor extension swiveled about the pivot 61. This trough extension is of the usual type and is provided with two hydraulic pistons 661 and 662 which are adapted to swing the trough extension about the pivot 61 to the right or left through leverage exerted by the cylinders on wire ropes 663 and 664. No further description of this mechanism is required herein as the same constitutes conventional apparatus for the manipulation of tail conveyor booms of standard type.

The conveyor mechanism is driven at the outby end of the tail boom by hydraulic motors 680 and 681 which are positioned upon each side of the tail boom. These are connected by chain drives 682 to the usual transmission for propulsion of the conveyor belting 655 throughout its length.

It is apparent that the tractor mechanism of this invention is adaptable for exertion of thrust upon the face of the seam mined. However, we have found that it is desirable to augment such thrust as may be exerted by the tractor by provision of additional thrusting means which are capable of producing tremendous force in a forward direction, and against the face, and which may be easily controlled by the operator through hydraulic media. As shown in this exemplification of our invention, additional thrust is obtained through the use of a plurality of thrusters 700, 701, 702 and 703 located upon the base of the machine and at the rear thereof. These thrusters are adapted for actuation in pairs and, as shown in Figure 19b, the two outboard thrusters, 700 and 703, are in their most forward position; whereas, the two inboard thrusters, 701 and 702, have been extended to their most rearward position. All of these thrusters are mounted upon pivot pins 710. These pivots are located in slots formed in a series of sliding blocks or pistons 711, 712, 713, 714. These pistons together with the thrusters mounted thereon are housed in a suitable casing generally indicated at 705 which is directly affixed to the base 500 and between bulkheads 505 and 506, the latter forming the rear bulkhead of the casing 705. The housing 705 together with this rear bulkhead 506, a forward transverse bulkhead 720, and a top 718, form an inclosure for these thrusters together with the several pistons 711, 712, 713 and 714. The said pistons are adapted to reciprocate in this housing and the bottom plate 500 is slotted as at 725 to permit the thrusters to extend downwardly toward the floor of the room and reciprocate as stated. Propulsion for each of these pistons is provided in the form of hydraulic cylinders 690, 690', 691 and 691' pivoted in the usual manner to the bulkhead 505. The actuator rods 731 of these several hydraulic cylinders are secured by pivotal connection to the forward ends of the pistons 711 to 714, inclusive. Each of the thrusters has an extension 708 thereon in the form of a pointed bar which may be screwed or splined into the main body of the thrusters. As shown in Figure 24, two of the thrusters have completed a rearward, or thrusting movement, engaging the floor of the room to exert thrust forwardly.

Upon the return or forward stroke of the pistons 711 to 714, inclusive, the thrusters are caused to be pivoted upwardly a substantial distance, such as shown in Figure 20b. This pivoting is obtained by the provision of a series of pins 716 which are located in appropriate longitudinal bores in each of the pistons. Two of such bores are positioned upon each side of each piston and so located as to open upon the forward face of each thruster just below the fulcrum or pivot point thereof. These pins 716 are of a predetermined length so that during return of the several pistons to their most forward position, the pins contact the forward bulkhead 720 of the casing 705. It is apparent that as the thrusters move forwardly, contact of these pins with the said bulkhead causes them to protrude a substantial distance from the rear face of each piston and engage the several thrusters upon each side thereof. This engagement of the pins with the thrusters causes them to pivot upwardly as stated so that they are each substantially raised above the room floor during the forward motion thereof. They remain in this position until the return or backward stroke of the several pistons and until the movement of the latter has been such that the several pins no longer contact the bulkhead 720. These pins may be formed with a substantial head portion 717 which causes them to be retained in the aforesaid bores.

From the foregoing construction, it will be seen that these thrusters will be forced in an upright position rearwardly upon the actuation of the piston 730. However, when said pistons 730 are retracted, the thrusters are forced to pivot upwardly about the pivot 710. Thus, during the return, or forward stroke, the thrusters ride over the floor without drag or impedance to the forward movement of the mechanism. Actuation of the thrusters rearwardly and in an upright position or a position where they can firmly engage the floor of the room causes them to dig into the said floor and exert a tremendous force forwardly. Assuming the thrusters in the position shown in Figure 19b, the outboard thrusters have completed an operating stroke, whereas the inboard thrusters have been retracted to take position for a following thrusting movement. By actuation of the two pairs of thrusters in series, a forward thrust may be constant or exerted at such times as necessary.

Such thrusting means are sufficient to exert the amount of thrust forwardly which may be necessary to effectuate a complete and clean cutting of the coal. With the amount of force under regulatory control of the operator, the machine can be edged forwardly the amount necessary to effectively mine without danger of exceeding that amount of thrust which would cause binding or other unnecessary stress upon the mechanism.

*Hydraulic control and lubrication system*

Figure 26A:
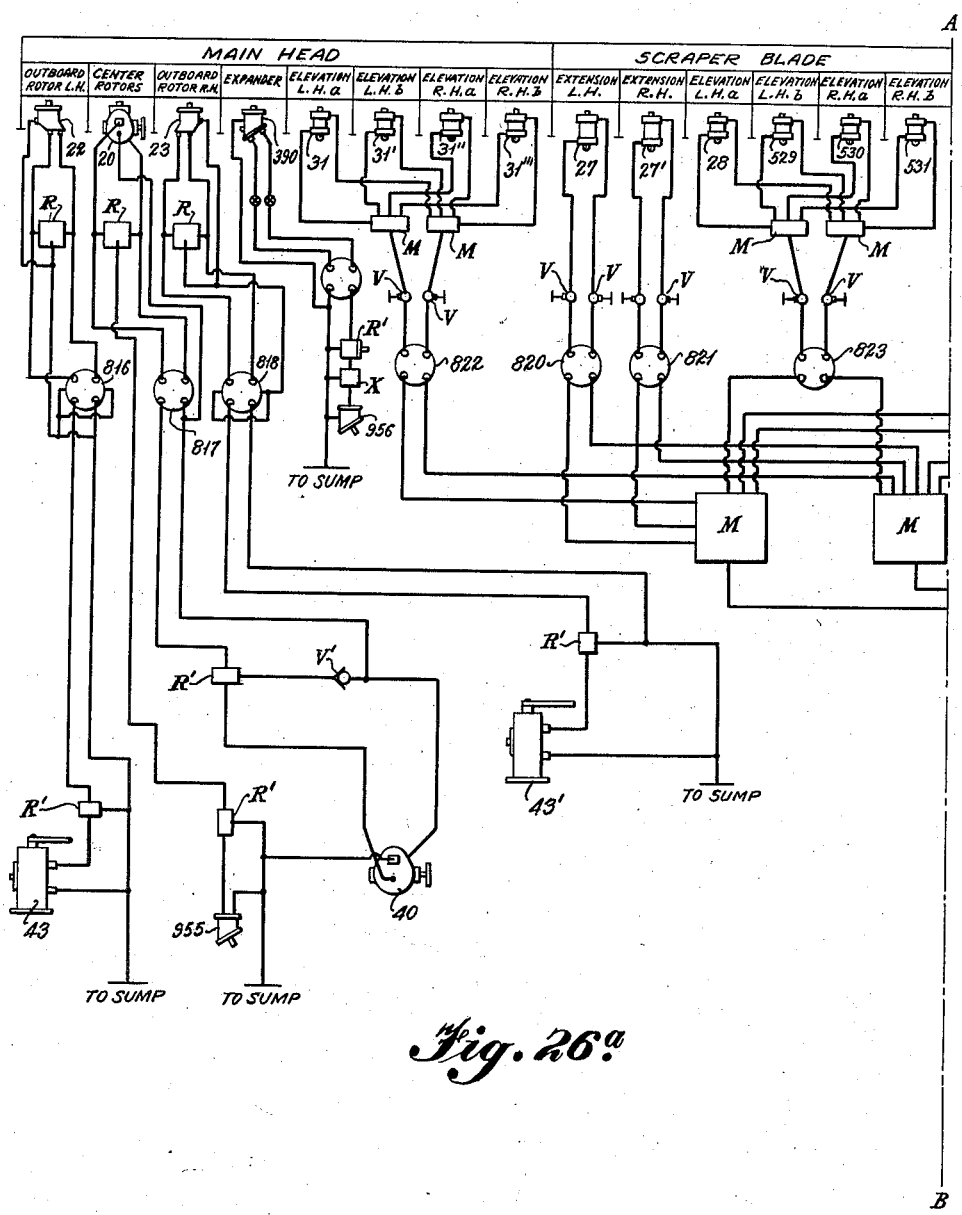
Figure 26a is a diagrammatic flow diagram of one-half of the hydraulic lines and equipment for control of the mechanism of this invention, broken at the line A—B.

The hydraulic operating controls and the associated mechanism which actuates all of the several elements of this invention are diagrammatically shown in Figures 26a and 26b. These figures, when used in conjunction with Figures 19b and 23, the latter diagrammatically illustrating the same controls upon the operator's forward and side control panels, are fully explanatory of the manner by which the various functions of this invention as heretofore defined and described are performed.

Referring to Figures 26a and 26b, it will be seen that these figures are in the nature of a flow sheet or diagram setting forth in detail the various hydraulic lines from the pumps heretofore referred to, and that these figures also illustrate the several hydraulic cylinders for the control of the mechanism. In these figures, all of the hydraulic pumps, hydraulic motors and hydraulic cylinders are numerically designated with the same numerals used as references in previous descriptions of this invention. These two figures are to be used together and include an explanation of the controls for the following component parts: the main transmission assembly, the scraper blade, the conveyor, and the thrusters. It will be seen that the hydraulic motors 20, 22, 23 and 390, all of which provide power for rotation of the rotor arms and expansion of the rotor end boxes, as well as all of the various hydraulic cylinders illustrated in these figures, are controlled through the operation of a series of four-way valves. Similarly, such type of valve is utilized for control of the motors 600 and 681 which provide propulsion of the conveyor. These four-way valves are common to the art and need not herein be described. They simply enable the operator to reverse flow of fluid with respect to any hydraulic unit, thereby enabling it to be actuated, or its motion reversed. These valves, indicated in these figures, are also referred to in Figures 19b and 23 where they retain the same numeral designation. However, in the latter figures, the controls are merely diagrammatically indicated as control levers, switches, etc.

Commencing at the forward part of the machine, it will be seen that valves 816 and 818 control the main transmission drives for the outboard rotors, both right and left, by actuation of motors 22 and 23. The inboard rotors are controlled by valve 817 which is utilized to actuate the central transmission motor, 20. The expander system for the end boxes, receiving power from hydraulic motor 390, is also controlled through a similar four-way valve 812. As hereinbefore described, four hydraulic cylinders 31, 31', 31" and 31'" are employed to elevate and lower the two elevator bars 30 upon which the main transmission housing is mounted in a manner hereinbefore described. All of these hydraulic cylinders are under the control of the operator by reason of their joint connection to the four-way valve 822. Thus, these five four-way valves control power drives for the forward portion of the mechanism.

All of the movements of the scraper blades are similarly controlled through the use of four-way valves. Referring to Figure 26a, it will be seen that valves 820 and 821 provide for the extension and retraction of the outboard scraper blades through power received from cylinders 27 and 27', respectively. Elevation of the blades, obtained through actuation of cylinders 28, 529, 531 and 530, is controlled through the same means, four-way valve 823. It will be seen that valves 822 and 823 provide for simultaneous function with each of the four banks of cylinders to which they are separately connected. Thus, valve 822 permits simultaneous actuation of the cylinders adapted to raise and lower the main head of the machine and valve 823 provides for simultaneous actuation of these cylinders permitting elevation and lowering of the scraper blades.

As hereinbefore described, the tail boom of the conveyor may be elevated or lowered through cylinders 675 and 675' and these also are actuated in unison through the use of the same type of four-way valve 802. The swing to right or left of the conveyor through hydraulic cylinders 651 and 652 is also accomplished by means of the four-way valve 801. As stated, the conveyor mechanism is driven through two hydraulic motors 680 and 681 and these are caused to function by manipulation of four-way valve 815 in a well-known manner.

The thrusters as herein described may be individually operated or actuated in pairs. As shown in Figure 26b, separate four-way valves control each hydraulic cylinder for actuation of such thrusters. Four-way valves 803, 804, 805 and 806 individually actuate and control the movement of cylinders 691', 691, 690' and 690, all of which are employed to actuate the thrusters.

All of the foregoing comprise the essential power sources for the various elements herein described. However, other hydraulic equipment such as is generally utilized in the art must be employed to balance the system in the performance of its ordinary functions. Such additional hydraulic equipment is all conventional and the use as herein referred to may be readily understood by those skilled in the art. Thus, needle valves V are located in each line leading to all of the cylinders just referred to and are also placed in the circuit of the two motors driving the conveyor mechanism. Similarly, V' designates check valves, one of which is found in the hydraulic circuit to the hydraulic motor 40 and the others of which are located in the lubrication system. Relief and replenishing valves R are supplied here for obvious purposes and relief valves R' are also interspersed throughout the system at the locations indicated. The designation X indicates diagrammatically the use of unloading valves which also comprise valves well-known within the art. It is apparent that a series of hydraulic manifolds are necessary and these are designated throughout Figures 26a and 26b at M.

Previous reference has been made to a series of relatively small hydraulic pumps generally designated at 41 driven through the main power source, electric motor 42. These smaller hydraulic pumps are interspersed throughout the hydraulic system as booster elements and, referring to Figures 26a and 26b, seven of such pumps are here shown and indicated respectively at 955 to 961, inclusive.

The seat cylinders for control of the operator's pallet, 56 and 56' respectively, are controlled through a four-way valve 825, receiving fluid from booster pump 957 through the manifold indicated adjacent thereto in Figure 26b. It will be seen that several of the hydraulic lines designated on Figures 26a and 26b are indicated as leading to the sump, which is the sump 70 as previously described. Reference to these figures indicates that all of the power for propulsion of the main head, that is, propulsion of the rotors during their cutting operation, is obtained from the three pumps previously described, 40, 43 and 43'.

We have incorporated in our preferred embodiment of this invention a one-shot lubrication system which permits lubrication of all essential moving parts, other than the several transmission drives, through a single control consisting of four-way valve 824. Referring to Figure 26b, it will be seen that a main lubrication manifold has ten lines leading therefrom, each of which terminate in smaller lube manifolds designated L—M. These ten smaller lube manifolds are provided with separate lubricating lines leading to the various elements for which lubrication must be constantly provided. These separate elements are set forth in Figure 26b wherein each unit of the mechanism receiving lubrication is separately indicated. The abbreviated designations of each lubrication outlet, as set forth in this chart, are felt to be self-explanatory. A lubrication oil reservoir L—L supplies fluid to the main lubrication manifold at the will of the operator. Valve 824 may be so manipulated as to actuate hydraulic cylinder 950 which is suitably connected to a lube cylinder 951, the latter exerting pressure when actuated upon the lubricant contained in the lubrication system in a well-known manner. Thus, referring to Figure 26b, when cylinder A is actuated with consequent actuation of cylinder B in one direction, lubricant is forced down from the lube reservoir L—L to the main lube manifold. Upon actuation of cylinder B in the opposite direction, lubricant is forced under pressure out of the main lubrication manifold and thence to the various elements designated in this figure. Check valves V' are of course located in the system between the lube reservoir and the main lube manifold to permit uni-directional flow of fluid only to those points sought to be lubricated.

We have found that lubrication of the main transmission drives such as those with respect to the center rotors, the drives for the two outboard rotors, and the drive transmissions for the extension and retraction system for the end transmission boxes, can be suitably provided for by making the housings for these several transmissions relatively air- and fluid-tight. For example, the main transmissions for the central rotors are located within the front head or main transmission casing of the mechanism. This is assembled in such manner that it is airtight. Lubricant may be admitted to this housing to a depth of several inches, and rotation of the several gear elements enables a splash lubrication of the same. Similarly, the end transmission housings for the end rotors, being relatively fluid- and air-tight, may also be partially filled with lubricant, enabling the splash system of lubrication thereof. Suitable fill lines are provided to each of these transmission housings and lubricant admitted under pressure in the desired amount through manipulation of valve 809 (Figure 23). In addition, we have found it desirable to admit air under pressure to the interior of these several transmission housings. Such air provides an effective seal, preventing admission of coal dust or other foreign matter into the interior of these several housings. This may be done in any suitable manner such as by having an appropriate air inlet line affixed to each of these three housings. Air admitted under a pressure of approximately three atmospheres is of sufficient pressure to perform the function just described. Admission of compressed air is also controlled by appropriate valve means 811 (Figure 23). It is thus apparent that lubrication of the more rapidly moving parts such as those contained within these respective housings is simply accomplished by a splash system; whereas, the one-shot lubrication system is confined generally to the lubrication of relatively inaccessible moving parts dispersed throughout other portions of the mechanism.

As previously noted, the clutch mechanisms used in conjunction with both the inboard and the outboard rotors and which effectuate the extension or retraction of the several rotor arms and associated elements are motivated through the use of master-slave units. These are not interrelated with the hydraulic system as shown in Figures 26a and 26b but are separate hydraulic units unto themselves. Actuation of the master, in each instance, results in corresponding actuation of the separate slave units, and controls for these are shown in Figure 19b where 900 diagrammatically represents the master for controlling the slave in the clutch mechanism of the left center forwardly extending rotor arms and 901 diagrammatically illustrates the master control for controlling the slave and thereby the clutch for the right center rotor arms.

Similarly, master-slave units also control extension and retraction of the outboard rotor arms, which are mounted upon the slidable end transmission boxes, as described. These also are separate from the hydraulic system, just described, being self contained hydraulic master-slave units, controlled by levers, as diagrammatically indicated in Figure 19b. Thus, the master-slave unit for extension or retraction of the left-hand outboard rotor arms is controlled through lever 904 and the master-slave unit for extension and retraction of the right-hand outboard rotor arms is controlled through lever 905. These master-slave hydraulic devices and the controls therefor are well-known within the prior art and, accordingly, no further description thereof is given herein.

Referring to Figure 23, E—E indicates the electric control box for control of the tractor drives through motors 490 and 491. The control for the left-hand motor is indicated at 807 and, for the right-hand motor, control 808 is provided. The gear shifts incorporated in the gear transmissions for driving the separate treads, are also shown in Figure 19b where knob 902 indicates the gear shift for the left tractor tread and 903, the gear shift for the right tractor tread.

Miscellaneous controls are also shown in Figures 19b and 23. Referring to the latter figure, 819 designates the starter switch for the main drive electric motor 42. It has also been found desirable to spray the face with water during mining. This is done simply by leading water lines along the tops of the respective casings 252 with the outlets thereof terminating just back of each of the rotor housings. With rotation of the rotor arms, water is caused to be sprayed in a fine spray forwardly by impingement upon the arms and rotor housings. The water control valve 810 is shown upon the side control panel, Figure 23.

It will thus be seen that this mechanism is largely hydraulic in operation, the use of hydraulic equipment enabling compactness and ease of manipulation of the various power outlets. Considering the magnitude of the mechanism, the controls therefor hereinbefore designated and located upon the two panels adjacent the operator are relatively few in number and most simple in operation.

From the foregoing detailed description, the operation of the invention should be readily understood. The mechanism is adapted to mine coal with the outboard rotor boxes in extended position laterally. In this position, it is possible to mine seams of extremely small height, such as, in this embodiment of the invention, approximately two and one-half feet, and still have ample space for retraction of the mechanism. With extension of the rotor arms to their maximum limits, seams of substantially greater height may also be mined, still with ample clearance for retraction. This adjustment in overall dimensions permits a flexibility of operation not heretofore found in prior mining mechanisms. Such flexibility of operation is further enhanced by other features, as the interchangeability of rotors and rotor arms to permit the mining of so-called "high coal"; extreme maneuverability of the mechanism, permitting its turning upon comparatively small radii; durability of structural design eliminating the possibility of frequent breakdowns; ease of control of the various elements of the invention by a single operator; adaptability to all types of mining systems; and comparatively low cost of operation. Other advantages of the invention will be readily apparent to those skilled in the art.

It is to be understood that while a specific embodiment of the invention has herein been illustrated and described, the invention is not necessarily limited to the structural details herein shown, and various changes therein and modifications thereto may be made without departing from the spirit of our invention as defined by the appended claims.

We claim:

1. In a mining machine, a plurality of rotor housings provided with rotor arms, said housings and arms being adapted for rotary cutting movement, a moveable carriage, said housings being mounted on the forward end of said carriage, at least one pair of rotor housings extending forwardly from said carriage a distance greater than the other housings, burster elements located concentrically on the axis of rotation of each of said housings means responsive to said rotary movement to continuously and uninterruptedly extend and retract said arms a predetermined distance with respect to said burster element.

2. In a mining machine having a series of rotor assemblies mounted for rotary movement and provided with cutting elements to cut a circular kerf, a rotor arm for supporting said elements, said rotor arm being secured to a rotor shank angularly disposed thereto, said shank being mounted for reciprocation in one of said rotor assemblies, and power actuated means in interconnection with said arm responsive to said rotary movement to extend said shank outwardly from said assembly and retract said shank into said assembly whereby the size of said circular kerf may be varied, said means providing for continuous uninterrupted movement of said shank during the extension and retraction thereof and for maintaining said shank in extended and retracted positions.

3. In a mining machine having a series of rotor housings each of which is provided with an oppositely mounted pair of rotor arms having cutting elements thereon for cutting a circular kerf, burster elements between each of said pairs, means to impart rotary motion to said housings, and common power means in interconnection with said arms and responsive to said rotary motion to extend and retract said arms during rotation thereof in one direction from said housings and to retract said arms into said housings during rotation thereof in an opposite direction, said means providing for continuous uninterrupted movement of said arms during the extension and retraction thereof.

4. In a mining apparatus having a series of inboard and outboard rotatable housings, each of which is provided with an oppositely mounted pair of rotor arms having cutting elements thereon for cutting a circular kerf, a burster element upon each of said housings at the axis of rotation thereof, means to impart rotary motion to said housings, means to extend said outboard housings laterally from said inboard housings, means to retract said outboard housings to a position adjacent said inboard housings, and means responsive to said rotary motion to extend said arms from said housings and retract said arms into said housings whereby said kerf may be varied in horizontal and vertical size.

5. In a mining apparatus adapted for forward motion on a mine floor, the combination of a rotor supporting frame, pairs of rotor arms provided with cutting elements and adapted for rotary cutting movement mounted on said frame with said arms and elements extending forwardly of said frame, a burster element located between said arms and concentric with the axis of rotation thereof, pivoted links on the front and rear of said frame, means engaged in said frame to raise and lower the frame on said links, said frame being in constant parallel relationship with the floor means to extend and retract said arms with respect to said burster element, whereby the areas of said cutting movement may be varied and the distance of said cutting movement above said mine floor may be varied.

6. In a mining machine having a rotatable housing provided with cutting means for cutting a circular kerf, a rotor arm comprising two sections right angularly disposed with respect to each other, one of said sections being adapted for slidable movement into and out of said housing, the other of said sections having cutter bits thereon, said other section having exterior and interior curved surfaces of lesser and greater radii respectively than the curvature of said kerf.

7. In a mining machine having a rotatable polygonal housing provided with cutting means for cutting a circular kerf, a rotor arm comprising two sections right angularly disposed with respect to each other, one of said sections being adapted for slidable movement into and out of said casing, the other of said sections having leading and trailing edges and cutter bits thereon, said trailing edge having a configuration to match said polygonal casing when said rotor arm is positioned in said casing, said other section having exterior and interior curved surfaces of lesser and greater radii respectively than the curvature of said kerf.

8. In a mining machine having a rotatable polygonal housing provided with cutting means for cutting a circular kerf, a rotor arm comprising two sections right angularly disposed with respect to each other, one of said sections being adapted for slidable movement into and out of said housing, the other of said sections having leading and trailing edges and cutter bits thereon, said trailing edge having a configuration to match said polygonal housing when said rotor arm is positioned in said housing, said other section having exterior and interior curved surfaces, said exterior surface being circumscribed upon a lesser radius than the radius of said kerf, said interior surface being circumscribed upon a greater radius than the radius of said kerf.

9. In a mining machine having a rotatable polygonal housing provided with cutting means for cutting a circular kerf, a rotor arm comprising two sections right angularly disposed with respect to each other, one of said sections being adapted for slidable movement into and out of said housing, the other of said sections having leading and trailing edges and cutter bits thereon, said trailing edge having a configuration to match said polygonal housing when said rotor arm is positioned in said housing, said other section having exterior and interior curved surfaces, said exterior surface being circumscribed upon a lesser radius than the radius of the outside circumference of said kerf, said interior surface being circumscribed upon a greater radius than the radius of the inside circumference of said kerf.

10. In a mining machine having a rotatable polygonal housing provided with a rotor arm having cutting elements thereon for cutting a circular kerf, means to rotate said housing and said arm, said arm being slidably engaged with said housing, means to extend and retract said arm with respect to said housing whereby kerfs of relatively small and relatively large sizes may be cut, said arm having exterior and interior curved surfaces, said exterior curved surface being the arc of a circle having a lesser diameter than the diameter of the smallest sized circular kerf cut by said elements, said interior curved surface being the arc of a circle having a diameter greater than the diameter of the largest sized circular kerf cut by said elements.

11. In a mining apparatus of the character described, a rotor supporting frame, a plurality of rotor housings on said frame, said housings having ends disposed at 45 degrees to the longitudinal axis thereof and being substantially of hexagonal configuration and greater in length than in width, rotor arms mounted in said housings, and provided with means for extension and retraction with respect thereto, means for rotating said housings and for positioning pairs of housings at an angle of 45° to the horizontal and parallel to each other, whereby said housings require less space than during rotation thereof.

12. In a mining apparatus, a rotor supporting frame having a rotatable housing thereon, a pair of rotor shanks having rotor arms extending right angularly therefrom, cutting means on said arms, said housing having a plurality of longitudinal bores therein, said pair of shanks being mounted in slidable relationship with two of said bores, extension and retraction means for said shanks in the bores with respect to the housing comprising two oppositely threaded elements mounted for rotation in two other of said bores, nuts in threaded engagement with each of said elements and attached to said shanks, means to rotate said elements comprising a pinion gear on each of said elements, a worm engaging said gears, and means to stop movement of said worm whereby when said pinion gear is driven rotatively, said nuts force said bars and arms toward or away from each other dependent on direction of rotation thereof.

13. In a mining apparatus, a rotor supporting frame, a drive shaft provided with a longitudinal passageway and mounted on said frame, a rotor housing provided with a plurality of longitudinal bores on said shaft, a pair of rotor shanks having rotor arms extending right angularly thereto and mounted for slidable movement in two of said bores, means to drive said shaft for rotation of said housing, arms and shanks, means to extend and retract said shanks with respect to said rotor housing, said means comprising an inner shaft positioned in said longitudinal passageway to normally rotate therewith, two oppositely threaded elements mounted for rotation in two other of said bores, nuts in threaded engagement with said elements and attached to said shanks, a gear on each of said elements having a worm in engagement therewith, said worm being affixed to said inner shaft, and means to stop rotation of said inner shaft during rotation of said rotor housing, whereby said nuts cause extension and retraction of said rotor arms dependent upon direction of rotation of said drive shaft.

14. In a mining apparatus, a rotor supporting frame, a rotor housing having bores therein to accommodate at least two rotor shanks, rotor shanks having rotor arms with cutters thereon in slidable engagement with two of said bores, means to limit movement of said shanks in said housing, a drive shaft for said housing having a longitudinal passageway therethrough, means to drive said shaft for rotation of said housing, threaded elements in said housing having nuts thereon, said nuts being in operative connection with said shanks, and means to drive said nuts on said elements including a shaft normally rotating with said drive shaft in said passageway, having a worm thereon, means to rotate said worm relatively to said housing during rotation thereof including means to stop rotation of said passageway shaft, and clutch means to permit rotation of said shaft after said limit means become effective.

15. In a mining apparatus, a rotor housing having at least two rotor shanks and arms in slidable engagement therewith and provided with means to limit movement thereof, a drive shaft having a passageway for said housing, means to extend and retract said shanks with respect to said housing including threaded elements provided with nuts thereon, said nuts being affixed to said rotor shanks, means to rotate said elements comprising an inner shaft in said passageway having a worm thereon, said inner shaft normally rotating with said drive shaft, and means to stop rotation of said inner shaft during rotation of said drive shaft including a pinion at the opposite end of said inner shaft, an internal spline having an aperture to engage said pinion, a pin adapted to engage said aperture, a dog clutch, and means permitting said pinion to reciprocate in said spline upon action of said dog clutch, whereby said inner shaft is permitted to continue normal rotation when said means to limit movement of said bars becomes effective.

16. In a mining apparatus, a rotor housing having at least two rotor shanks and arms in slidable engagement therewith and provided with means to limit movement thereof, a drive shaft having a passageway for said housing, means to extend and retract said shanks with respect to said housing including threaded elements provided with nuts thereon, said nuts being affixed to said rotor shanks, means to rotate said elements comprising an inner shaft in said passageway and including a worm thereon, said inner shaft normally rotating with said drive shaft, and means to stop rotation of said inner shaft during rotation of said drive shaft including a pinion at the opposite end of said inner shaft, a spline having external and internal teeth, a gear to engage said external teeth for stopping rotation of said pinion and said inner shaft, dog clutch means, said pinion being adapted for reciprocation in engagement with said internal teeth whereby said shaft by actuation of said dog clutch means is permitted to continue normal rotation when said means to limit movement of said bars becomes effective.

17. In a mining apparatus, the combination of a tractor carriage having means to exert forward thrust, a transverse rotor supporting frame on said carriage, dovetails parallel to said frame on each end thereof, rotor transmission assemblies slidably mounted in said dovetails, rotor housings on said frame and said assemblies, said frame housings extending forwardly a greater distance than said assembly housings, rotor arms on each of said casings for rotary movement to cut a circular kerf, means to increase and decrease the distance of said arms from the axis of rotation thereof, means to extend and retract said assemblies laterally in the dovetails of said frame comprising oppositely threaded nuts on said assemblies, a shaft in said frame oppositely threaded at its respective ends for engagement with said nuts, said shaft being mounted for rotation, hydraulic motor means to drive said shaft in opposite directions, and stop means to stop separating motion of said assemblies at a predetermined point, said hydraulic motor having fluid bypass means interconnected therewith to eliminate overload thereof when said stop means is actuated.

18. In a mining apparatus, the combination of a tractor carriage adapted to exert forward thrust, a transverse rotor supporting frame on said carriage, said frame being provided with a trackway on each end thereof, rotor drive and transmission assemblies mounted in each of said trackways for slidable engagement therewith, two rotor casings on said frame, drive means in said frame for rotating said rotor casings, rotor housings on each of said assemblies, said casings extending forwardly substantially further than said housings, two rotor arms on each of said casings and housings for cutting a circular kerf, said arms being adaptable for rotary cutting movement to cut a circular kerf, means for varying the distance of said arms from the axis of rotation, means to reciprocate said assemblies in said trackways comprising threaded elements thereon, a shaft parallel to said frame mounted for rotary movement therein, said shaft being oppositely threaded at each end thereof for threaded engagement with said elements, whereby the horizontal and vertical size of said kerf may be varied.

19. In a mining apparatus, the combination of a tractor carriage adapted to exert forward thrust, a transverse rotor supporting frame on said carriage, said frame being provided with a trackway on each side thereof, rotor drive and transmission assemblies mounted in each of said trackways for slidable engagement therewith, two rotor housings on said frame, rotor housings on each of said assemblies, said housings having at least two rotor shanks and arms in slidable engagement therewith and provided with means to limit movement thereof, a drive shaft having a passageway for each of said housings, means to retract and extend said arms with respect to said housings including threaded elements provided with nuts thereon, said nuts being affixed to said rotor shanks, means to rotate said elements including an inner shaft in said passageway having a worm thereon, said worm being in engagement with said threaded elements, said inner shaft normally rotating with said drive shaft, and means to stop rotation of said drive shaft, clutch means to permit rotation of said inner shaft after said movement limiting means is actuated, means to reciprocate said assemblies in said trackways comprising threaded elements thereon, a shaft parallel to said frame mounted for rotary movement therein, said parallel shaft being oppositely threaded at each end thereof for threaded engagement with said threaded elements, whereby the over-all horizontal and vertical size of said kerf may be varied.

20. In a mining apparatus, the combination of a movable tractor mechanism adapted for movement on a room floor, a rotor supporting frame upon one end of said mechanism, rotors on said frame provided with rotor arms having kerf cutting elements thereon for cutting a circular kerf in the face, means to vary the center to center distance laterally between said rotors, means to vary the distance of said arms from their respective axes, and means to raise and lower said frame, said means comprising supporting bars for said frame and right angularly disposed thereto, links pivoted to said bars, said links being pivoted to said mechanism said links permitting upward movement of said frame parallel to said floor only, and means to impart upward thrust upon said bars to move said bars upwardly upon said links, whereby the size of the kerf may be varied and the distance of said rotors above room floor may be varied.

21. In a mining apparatus, the combination of a tractor mechanism for rearward and forward movement on a room floor, a rotor supporting frame at the forward end of said mechanism, rotors on said frame provided with rotor arms, means to extend and retract said arms with respect to the respective axes of said rotors, means to vary the center to center distance between said rotors, said arms having kerf cutting elements for cutting a kerf of various dimensions in the face, means to raise and lower said frame and said rotors, said means comprising supporting bars for said frame positioned parallel to said movement and disposed at right angles to said frame, links pivotally interconnected with said mechanism and said frame, said links, bars and frame forming a parallelogram said pivoted links permitting only movement of the frame parallel to the room floor, and thrust means to impart thrust against said bars away from said mechanism, said thrust means increasing the distance between said bars and said mechanism when actuated, whereby said kerf may be varied in size and the distance of said rotors above the room floor may be varied.

22. In a mining apparatus, the combination of a tractor mechanism for rearward and forward movement on a room floor, a rotor supporting transmission housing at the forward end of said mechanism, rotors on said housing provided with rotor arm extending and retracting means, said arms having kerf cutting elements thereon, means to raise and lower said housing with respect to said mechanism, said means comprising elevating bars on said housing extending rearwardly and parallel to the longitudinal axis of said mechanism, said bars having fore and after link elements pivotally connected thereto and pivotally interconnected to said mechanism said pivoted link elements permitting only movement of the frame parallel to the room floor, hydraulic pistons interconnected with said bars to exert upward thrust thereupon, and means to control the actuation of said pistons, whereby the size of said kerf may be varied and the distance of the axes of said rotors above the room floor may be varied.

23. In a mining apparatus, the combination of a tractor mechanism for rearward and forward movement on a room floor, a rotor supporting frame at the forward end of said mechanism, a plurality of inboard and outboard rotors on said frame provided with adjustable rotor arms having kerf cutting elements thereon for cutting a kerf of various dimensions in the face, means to laterally extend and retract said outboard rotors with respect to said mechanism, means to raise and lower said frame and said rotors comprising at least two frame elevating bars connected to said frame and extending rearwardly and parallel to said mechanism, said bars having pivoted links at each end thereof, said links, bars, and mechanism comprising a parallelogram of adjustable dimensions, hydraulic piston means on each of said bars to exert thrust against said links and bars in a direction upwardly from said mechanism said parallelogram maintaining said frame in parallel relationship with said floor during upward movement thereof, said thrust means when extended increasing the vertical distance between said bars and frame and said mechanism, said increase of vertical distance enabling variation of the kerf cutting height of said elements.

24. In a mining apparatus, the combination of a rotor supporting frame, a series of inboard and outboard rotatable housings on said frame, a pair of rotor arms having cutting elements on each housing for cutting a circular kerf, a burster centrally located on each housing and between each pair of rotor arms, means to extend and retract said arms with respect to said housings, means to extend and retract said outboard housings with respect to said inboard housings comprising reversely threaded nut elements on each of said outboard housings, a transverse member mounted for rotation in said frame, said member being reversely threaded at its respective ends for engagement with said nut elements, means to rotate said member in a direction to extend and retract said outboard housings, stop means to limit the amount of separating movement of said outboard housings, means to drive said inboard housings synchronously, said means comprising drive shafts having drive pinions on said inboard rotor housings, idler gears engaging said pinions, means to drive said idlers comprising a hydraulic motor having a spur gear, an intermediate reduction gearing between said spur gear and said idler gears, and means to drive said outboard rotor housings comprising a hydraulic drive motor for each of said outboard housings, said drive motor being adapted for lateral movement with said outboard housings, each of said drive motors being engaged with reduction gearing for driving said outboard housings at reduced speed.

25. In an apparatus of the described type, wherein the overall height and width thereof may be adjusted, a scraper blade device comprising a frame, a pivot on said frame, said blade being mounted on said pivot for axial rotation thereof, a second blade in slidable relationship with the scraper blade, means to cause said blades to rotate on said pivot, and means to extend or retract said scraper blade laterally with respect to said second blade.

26. In an apparatus of the described type, wherein the overall height and width thereof may be adjusted, a scraper blade device comprising a frame, a pivot on said frame, said blade being mounted on said pivot for axial rotation thereof, a second blade in slidable relationship with the scraper blade, hydraulic piston means to rotate said blades on said pivot, and hydraulic piston means engaging said scraper blade to extend and retract said scraper blade laterally with respect to said second blade.

27. In a mining apparatus of the character described, a rotatable housing of polygonal configuration to support rotary cutting means, said housing being adapted for rotary cutting movement, said housing having two adjacent longitudinal bores therein, rotor bars mounted for reciprocal movement in said bores, at least one rotor arm extending angularly to said bars, and means responsive to said rotary cutting movement to extend and retract said bars, said means providing for continuous uninterrupted movement of said bars during the extension and retraction thereof.

28. In a mining machine, a plurality of rotor housings, at least one rotor arm in each of said housings, said housings and said arms being adapted for rotary cutting of a circular kerf, a burster centrally located with respect to each of said arms, means to vary the distance between said arms and the axes of said bursters whereby the effective cutting size of said arms may be varied and means to outwardly extend and retract at least one of said housings with respect to other of said housings to change the size of said kerf.

29. In a mining machine having at least one rotor housing, a rotor arm slidably mounted in said housing, said rotor arm having cutter elements thereon for cutting a circular kerf, a burster element at the axis of rotation of said rotor arm, means to impart rotary motion to said housing, and common power means in interconnection with said arm, said power means being responsive to said rotary motion in one direction to extend said arm from said housing and to retract said arm into said housing upon rotary motion in the opposite direction, said last-named means providing for substantially continuous uninterrupted movement of said arms during the extension and retraction thereof.

30. In a mining apparatus having a series of inboard and outboard rotatable housings, each of which is provided with at least one rotor arm having cutting elements thereon for cutting a circular kerf, means to impart rotary motion to said housings, a burster element upon each of said housings at the axis of rotation thereof, power actuated means to extend said outboard housings laterally from said inboard housings, power actuated means to retract said outboard housings from extended position thereof, and common power actuated means in interconnection with said arms responsive to said rotary motion in one direction to extend said rotor arms from said housings and responsive to said rotary motion in the opposite direction to retract said arms into said housing whereby said kerf may be varied in horizontal and vertical size.

31. In a mining apparatus of the character described, a rotor supporting frame, a plurality of rotor housings on said frame, said housings having ends disposed approximately 45° to the longitudinal axes thereof and being of substantially hexagonal configuration, a rotor arm mounted in each of said housings for cutting a circular kerf, means for rotation of said housings, means responsive to said rotation to extend and retract said rotor arms with respect to said housings, and means for positioning pairs of housings at an angle of approximately 45° to the horizontal and parallel to each other, whereby the size of said kerf may be varied and said housings may be retracted and positioned to occupy less space required for rotation thereof.

32. In a mining apparatus, the combination of a main frame, a rotor supporting frame, a transverse transmission casing, a series of inboard and outboard rotatable housings on said frame, at least one rotor arm having cutting elements thereon mounted on each housing for cutting a circular kerf, a burster positioned at the axis of rotation of each of said arms, means within said housings to extend and retract said arms with respect to said housings, said means being responsive to the rotation of said housings, said means locking said arms in extended and retracted positions, means within said casing to extend and retract said outboard housings with respect to said frame, and means to raise and lower said rotor supporting frame in constant parallel relationship with said main frame, whereby the effective cutting surfaces of said machine may be varied in size.

33. In a mining machine, a main frame, a series of rotor housings on said frame, said housings being provided with at least one rotor arm having cutter elements thereon for cutting a circular kerf, means for rotation of said housings, a burster element positioned at the axis of rotation of each of said arms, means responsive to said rotation to extend said arms from said housings and retract said arms into said housings, means to extend and retract said housings with respect to each other laterally whereby the center to center distance of said burster elements is varied, means to raise and lower said frame with respect to said machine, and means for maintaining the said axes of rotation of said housings at all times parallel to the longitudinal axis of said machine.

34. In a mining machine adapted to cut a circular kerf, a rotor axis, at least one rotor arm mounted radially on said axis, means to rotate said rotor arm, a burster means mounted on and in axial alignment with said axis, common power means in interconnection with said arm and actuated by said rotation of said arm in one direction to extend said arm and in the reverse direction to retract said arm with respect to said axis, said power means including means to maintain said arm in adjusted extended and retracted positions during rotation thereof.

35. In a mining machine adapted to cut a circular kerf, a rotor axis, at least one rotor arm mounted radially on said axis, means for rotation of said arm on said axis, a burster means mounted on and in axial alignment with said axis and adapted to effectuate a bursting action at the center of said kerf in association with said arm, selective power means actuated by rotation of said arm in one direction to uninterruptedly extend said arm and by rotation of said arm in an opposite direction to uninterruptedly retract said arm with respect to said axis, said power means including means to stop movement of said arm at a preselected position and to maintain said arm in said position during rotation thereof.

36. In a mining machine, a rotor axis, at least one rotor arm mounted radially on said axis, said arm having a forwardly extending portion adapted to cut a circular kerf, said portion having kerf engaging bits along a portion of the outer side thereof adapted to engage said kerf whereby said bits prevent binding and facilitate turning of said machine, a burster means mounted on and in axial alignment with said axis, means to impart rotary movement to said burster and said arm, and selective means in association with said arm actuated by said movement in one direction to continuously extend said arm and, by said movement in an opposite direction, to continuously retract said arm with respect to said axis and to maintain said arm in extended and retracted positions during rotation thereof.

37. In a mining machine, a series of forwardly extending rotors, each of said rotors having rotor arms adapted for rotary cutting movement, burster means mounted in axial alignment with said rotors, said arms having kerf engaging bits along the outer sides thereof to prevent binding and facilitate turning of said machine, each of said rotors having means in association with said arms and selectively actuated by said rotary cutting movement in one direction to extend said arms with respect to said rotors and by said rotary cutting movement in an opposite direction to retract said arms with respect to said rotors, including means to maintain said arms in extended and retracted positions during rotation thereof, whereby any one of said series of said rotors may be adjusted to a cutting size greater than that of any other of said series.

38. In a mining machine having a plurality of rotor housings, each of which is provided with a rotor arm having cutting elements thereon for cutting a circular kerf, a burster element axially mounted on each of said housings, means to impart rotary motion to said housings, common power means in interconnection with said arms and responsive to said motion to extend said arms during rotation thereof in one direction from said housings and to retract said arms into said housings during rotation thereof in an opposite direction, said means providing for continuous movement of said arms during the extension and retraction thereof, and means to vary the elevation of the axes of rotation of said arms to accommodate changes in the length of said arms relative to said axes, respectively.

39. In mining equipment, a main rotor support, the support being provided with a pair of transversely extending slots, an arm slidably mounted in each said slot, a rotor drive shaft carried by each said arm, and means to adjustably slide the arms in the slots to simultaneously move said shafts toward or away from one another.

References Cited in the file of this patent

UNITED STATES PATENTS

| | | |
|---|---|---|
| 171,354 | Cooley | Dec. 21, 1875 |
| 405,553 | Hicks | June 18, 1889 |
| 414,893 | Stanley | Nov. 12, 1889 |
| 504,179 | Stanley | Aug. 29, 1893 |
| 507,891 | Dunschede | Oct. 31, 1893 |
| 591,449 | Blair | Oct. 12, 1897 |
| 632,230 | Berger | Sept. 5, 1899 |
| 1,333,491 | Hughes | Mar. 9, 1920 |
| 1,335,723 | Campbell | Apr. 6, 1920 |
| 1,445,085 | Joy | Feb. 13, 1923 |
| 1,517,802 | Sheen | Dec. 2, 1924 |
| 1,603,621 | McKinlay | Oct. 19, 1926 |
| 1,726,963 | McKinlay | Sept. 3, 1929 |
| 1,871,638 | Vodoz | Aug. 16, 1932 |
| 1,953,402 | Graham | Apr. 3, 1934 |
| 1,993,948 | Schroeder | Mar. 12, 1935 |
| 2,062,656 | Joy | Dec. 1, 1936 |
| 2,105,504 | Ramsay | Jan. 18, 1938 |
| 2,261,162 | Joy | Nov. 4, 1941 |
| 2,269,781 | Osgood | Jan. 13, 1942 |
| 2,299,150 | Kennedy | Oct. 20, 1942 |
| 2,327,928 | Osgood | Aug. 24, 1943 |
| 2,570,400 | Stein | Oct. 9, 1951 |
| 2,606,010 | Howard | Aug. 5, 1952 |
| 2,694,562 | Snyder | Nov. 16, 1954 |
| 2,694,563 | Graham | Nov. 16, 1954 |

FOREIGN PATENTS

| | | |
|---|---|---|
| 290,349 | Great Britain | May 10, 1928 |
| 631,099 | Great Britain | Oct. 27, 1949 |

OTHER REFERENCES

Colmol article in "Coal Mining" magazine, Feb. 1949, pages 15, 16, 17, 18.